United States Patent
Ahn et al.

(10) Patent No.: US 11,751,185 B2
(45) Date of Patent: Sep. 5, 2023

(54) METHOD FOR TRANSMITTING/RECEIVING SIGNALS BY USING BEAMS IN WIRELESS COMMUNICATION SYSTEM, AND DEVICE FOR SAME

(71) Applicant: LG ELECTRONICS INC., Seoul (KR)

(72) Inventors: Minki Ahn, Seoul (KR); Jiwon Kang, Seoul (KR); Kijun Kim, Seoul (KR); Jonghyun Park, Seoul (KR); Kilbom Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 63 days.

(21) Appl. No.: 17/199,760

(22) Filed: Mar. 12, 2021

(65) Prior Publication Data

US 2021/0204266 A1 Jul. 1, 2021

Related U.S. Application Data

(63) Continuation of application No. 16/475,899, filed as application No. PCT/KR2018/000038 on Jan. 2, 2018, now abandoned.
(Continued)

(51) Int. Cl.
*H04W 72/044* (2023.01)
*H04W 16/28* (2009.01)
(Continued)

(52) U.S. Cl.
CPC ......... *H04W 72/046* (2013.01); *H04W 16/28* (2013.01); *H04W 72/21* (2023.01); *H04W 84/042* (2013.01)

(58) Field of Classification Search
CPC .................................................. H04W 72/046
See application file for complete search history.

(56) References Cited

U.S. PATENT DOCUMENTS

2013/0286960 A1 10/2013 Li et al.
2015/0215908 A1* 7/2015 Seo ..................... H04L 5/0048
370/329
(Continued)

OTHER PUBLICATIONS

R1-1613727: 3GPP TSG RAN WG1 meeting #87, Reno, USA, Nov. 14-18, 2016, WF on beam indication and reporting, Samsung, Ericsson, NTT Docomo, Intel, LGE, Verizon, KT, pp. 1-7.
(Continued)

*Primary Examiner* — Abdeltif Ajid
(74) *Attorney, Agent, or Firm* — BRYAN CAVE LEIGHTON PAISNER LLP

(57) ABSTRACT

The present specification provides a method for transmitting/receiving signals through beams in a wireless communication system. The signal transmission/reception method performed by a terminal, in the present specification, may comprise the steps of: receiving a beam reference signal used in beam management from an eNB via a first Rx beam; if beam reporting is triggered, reporting to the eNB a measurement result based on the beam reference signal; receiving, from the eNB, control information related to the determination of a second Rx beam for receiving a particular signal; and receiving the particular signal via the second Rx beam on the basis of the received control information.

6 Claims, 11 Drawing Sheets

Related U.S. Application Data

(60) Provisional application No. 62/521,258, filed on Jun. 16, 2017, provisional application No. 62/479,384, filed on Mar. 31, 2017, provisional application No. 62/475,900, filed on Mar. 24, 2017, provisional application No. 62/472,496, filed on Mar. 16, 2017, provisional application No. 62/441,569, filed on Jan. 3, 2017.

(51) Int. Cl.
*H04W 72/21* (2023.01)
*H04W 84/04* (2009.01)

(56) References Cited

U.S. PATENT DOCUMENTS

| | | | | |
|---|---|---|---|---|
| 2015/0334762 | A1* | 11/2015 | Yang | H04W 72/0406 370/329 |
| 2016/0127991 | A1 | 5/2016 | Ang | H04W 72/042 455/522 |
| 2017/0251518 | A1 | 8/2017 | Agiwal | H04W 76/28 |
| 2017/0303265 | A1 | 10/2017 | Islam | H04B 7/0417 |
| 2018/0083680 | A1 | 3/2018 | Guo | H04B 7/0626 |
| 2019/0261329 | A1* | 8/2019 | Park | H04L 5/0048 |
| 2020/0077368 | A1* | 3/2020 | Tang | H04W 72/04 |

OTHER PUBLICATIONS

R1-1612514: 3GPP TSG RAN WG1 meeting #87, Reno, USA, Nov. 14-18, 2016, Samsung, "Discussions on beam recoverymechanisim," pp. 1-5.

R1-1611982: 3GPP TSG RAN WG1 meeting #87, Reno, USA, Nov. 14-18, Intel Corporation, "Discussion onbeam recovery in NR," pp. 1-7.

R1-1611422: 3GPP TSG RAN WG1 meeting #87, Reno, USA, Nov. 14-18, 2016, ZTE, ZTE Microelectronics, "Discussion on beam recovery mechanism," pp. 1-6.

* cited by examiner

【Drawings】
【Figure 1】
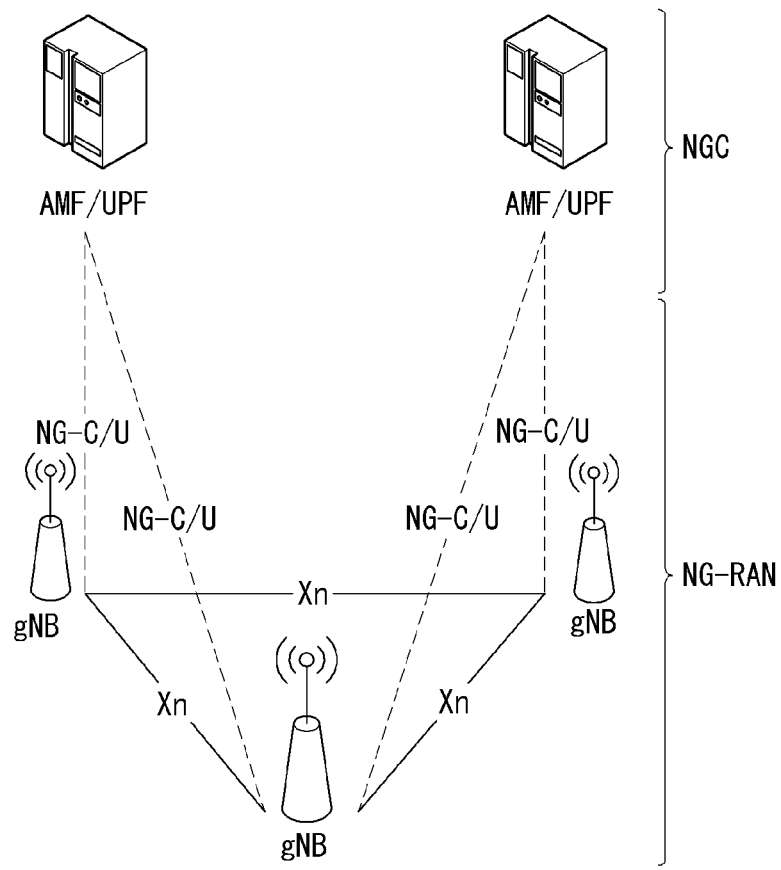
【Figure 2】
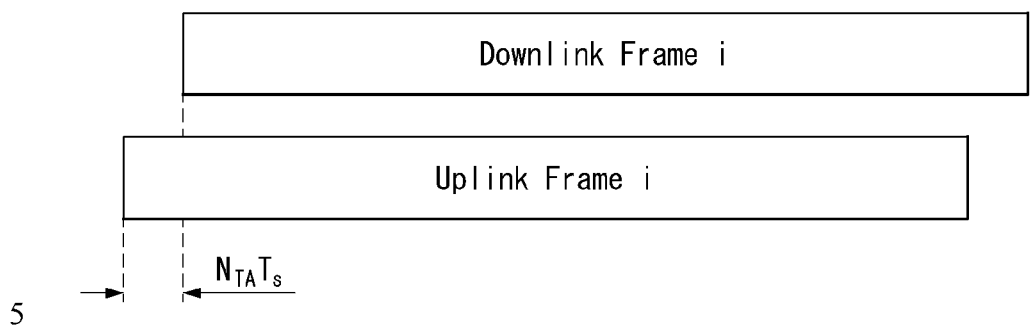

【Figure 3】
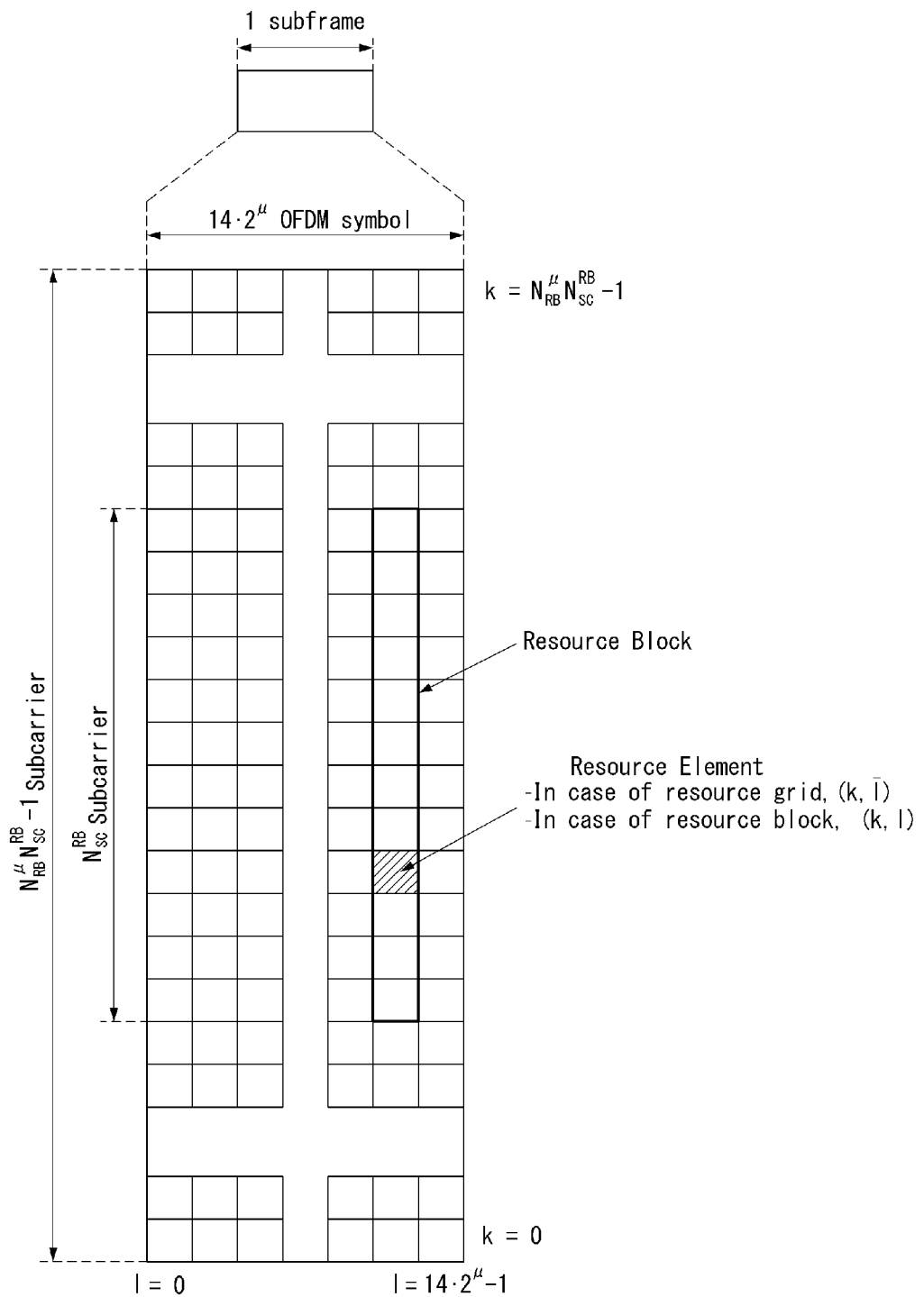

[Figure 4]
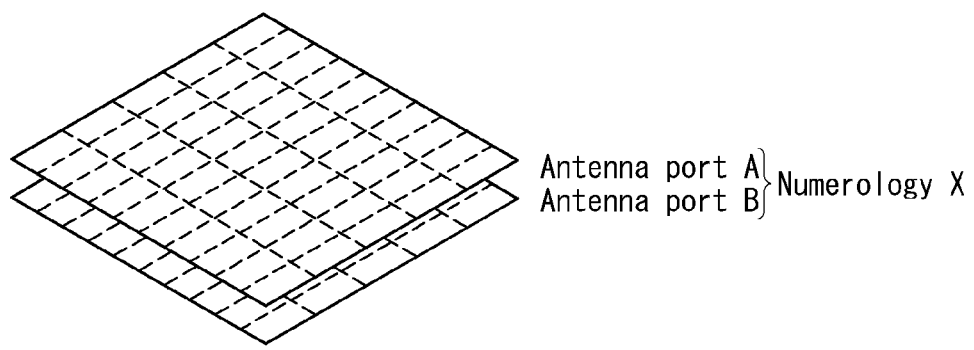
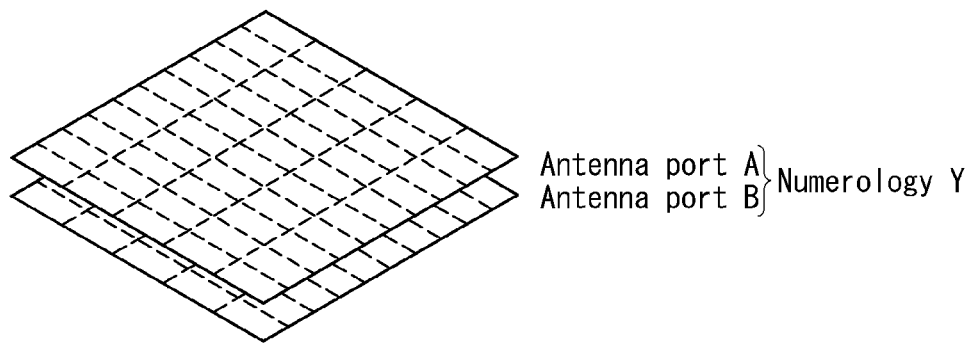

[Figure 5]
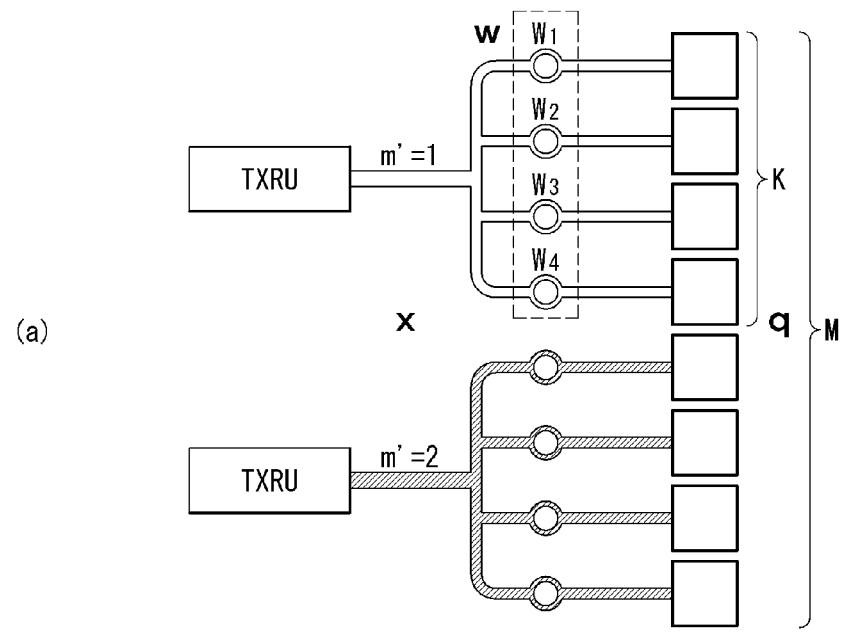
(a)
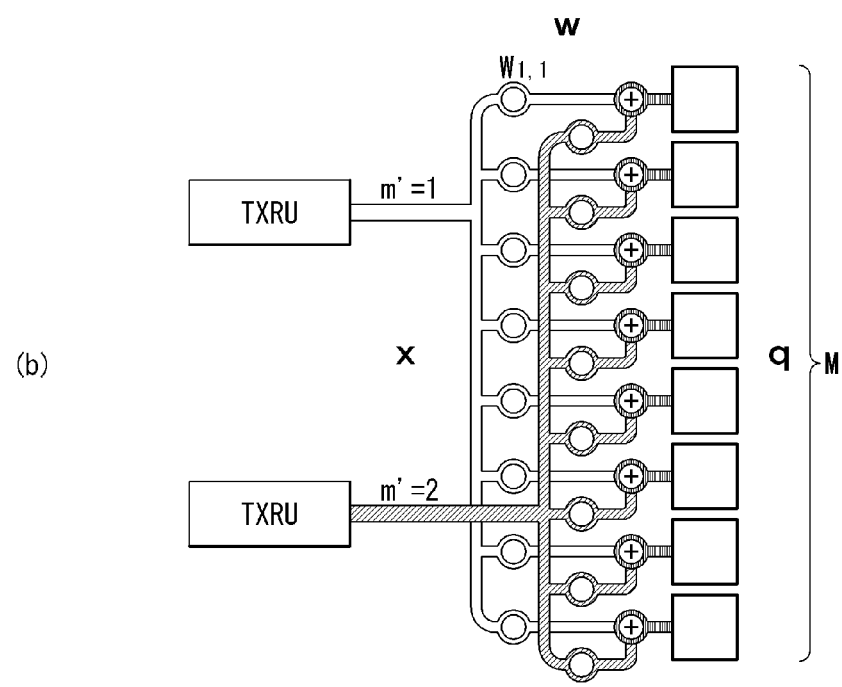
(b)

[Figure 6]
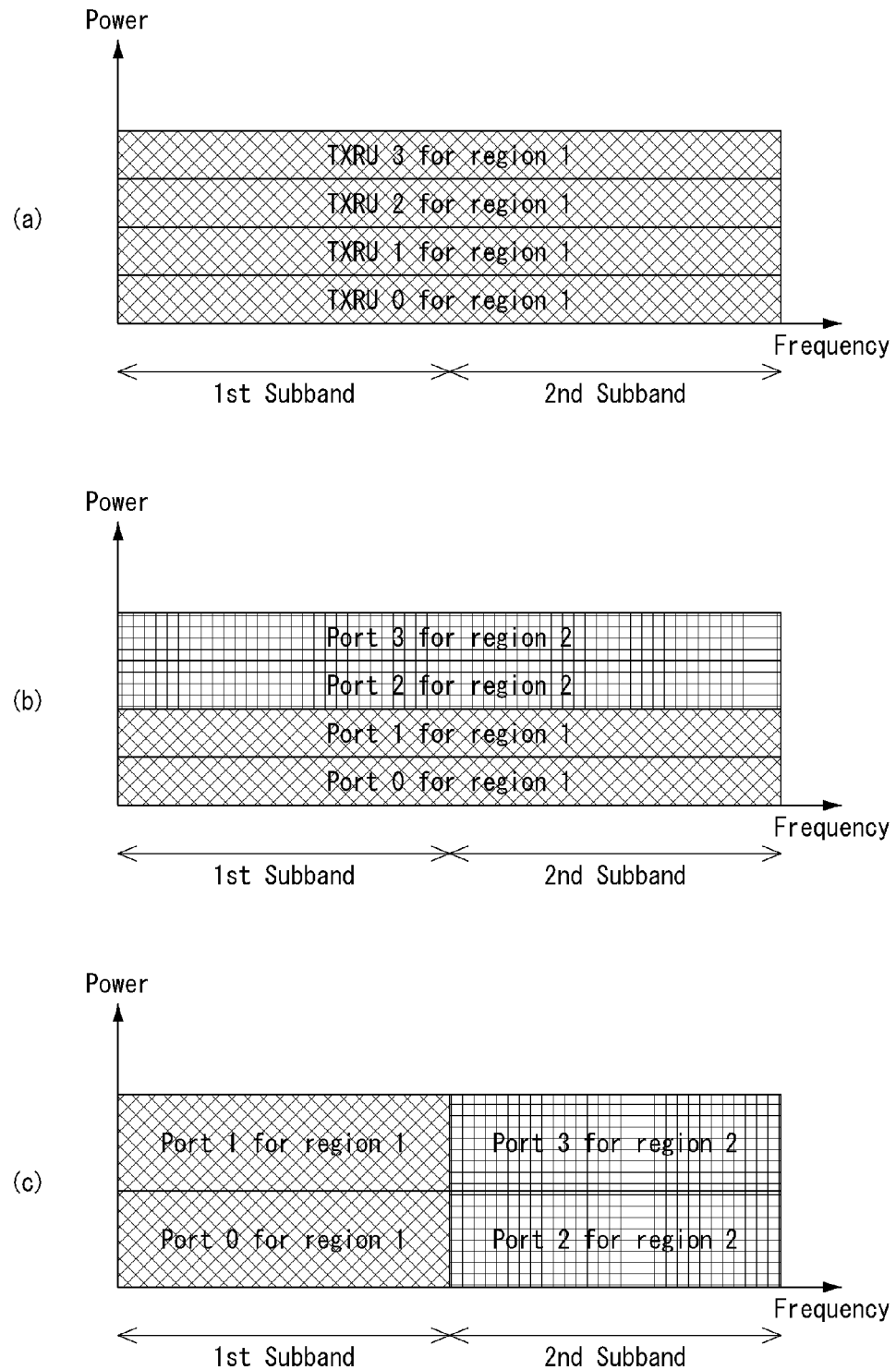

[Figure 7]
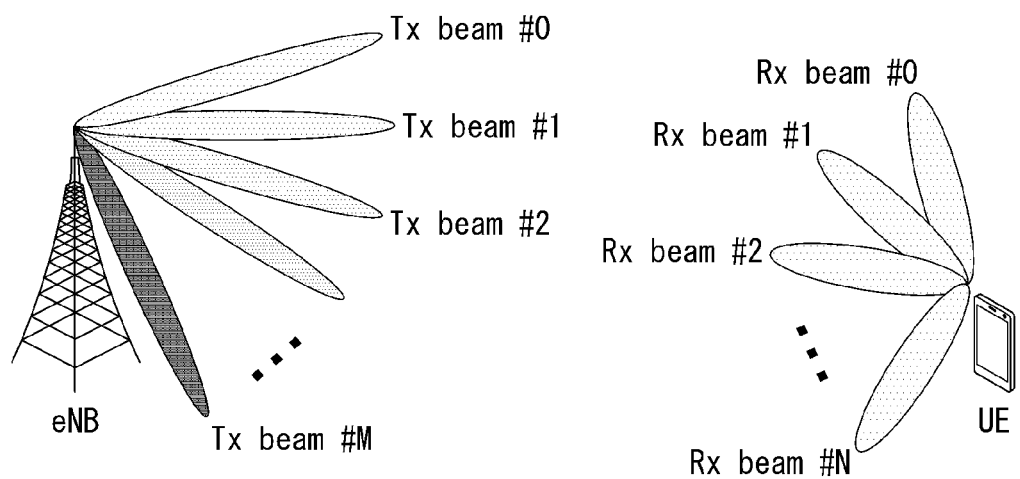

[Figure 8]
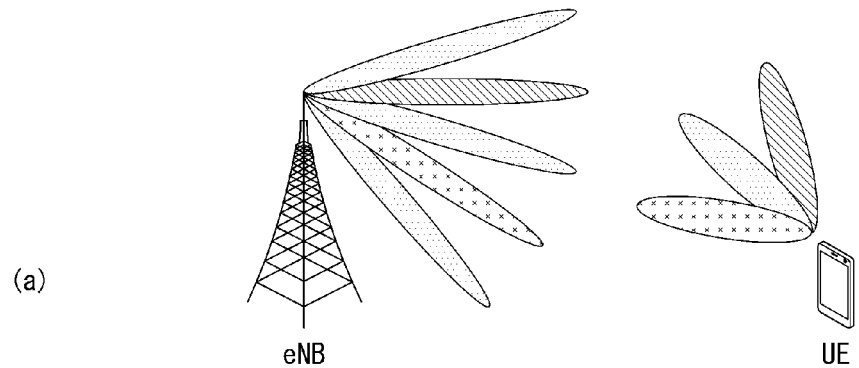
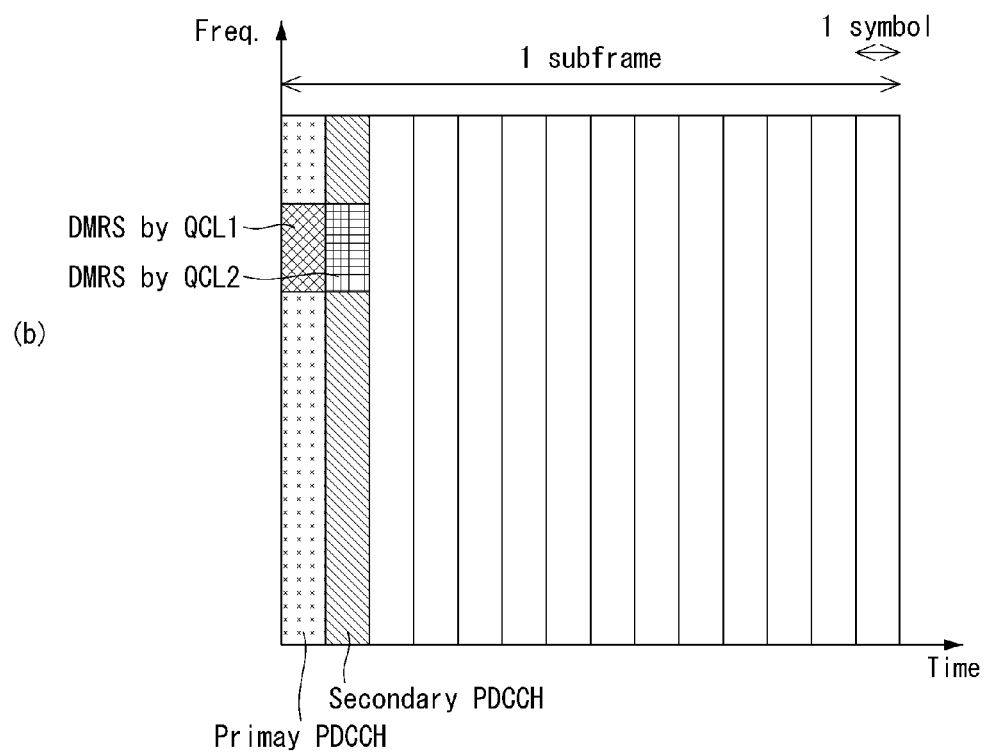

【Figure 9】
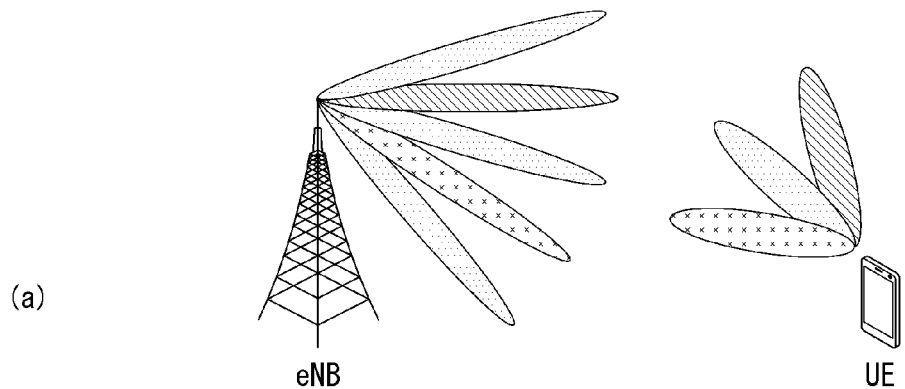
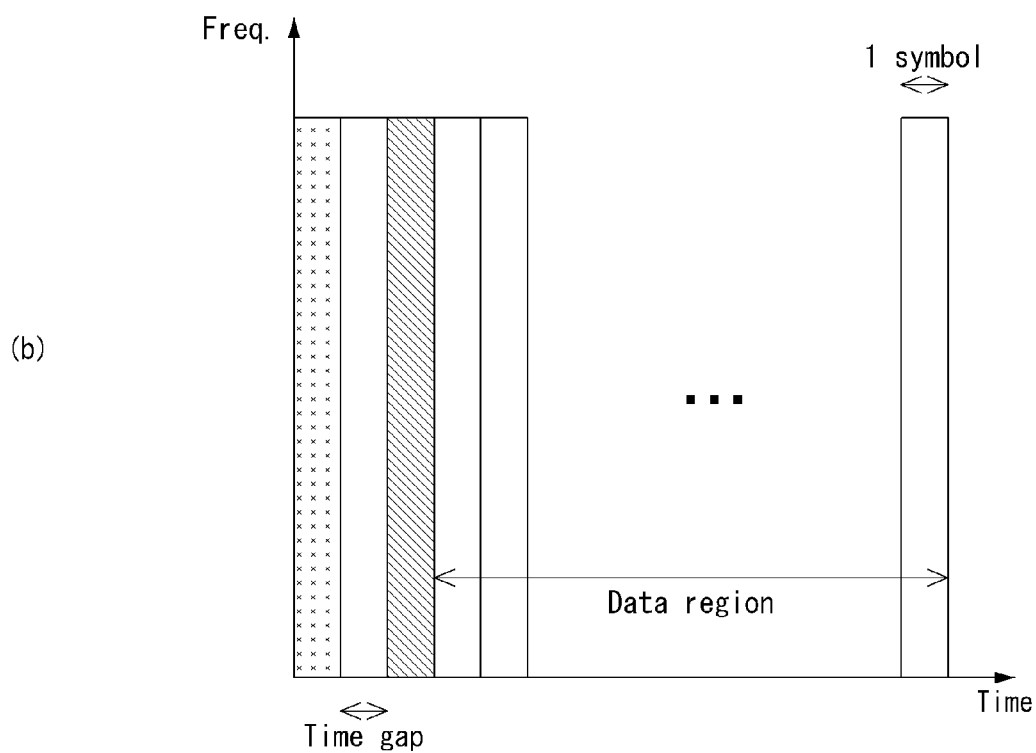

[Figure 10]
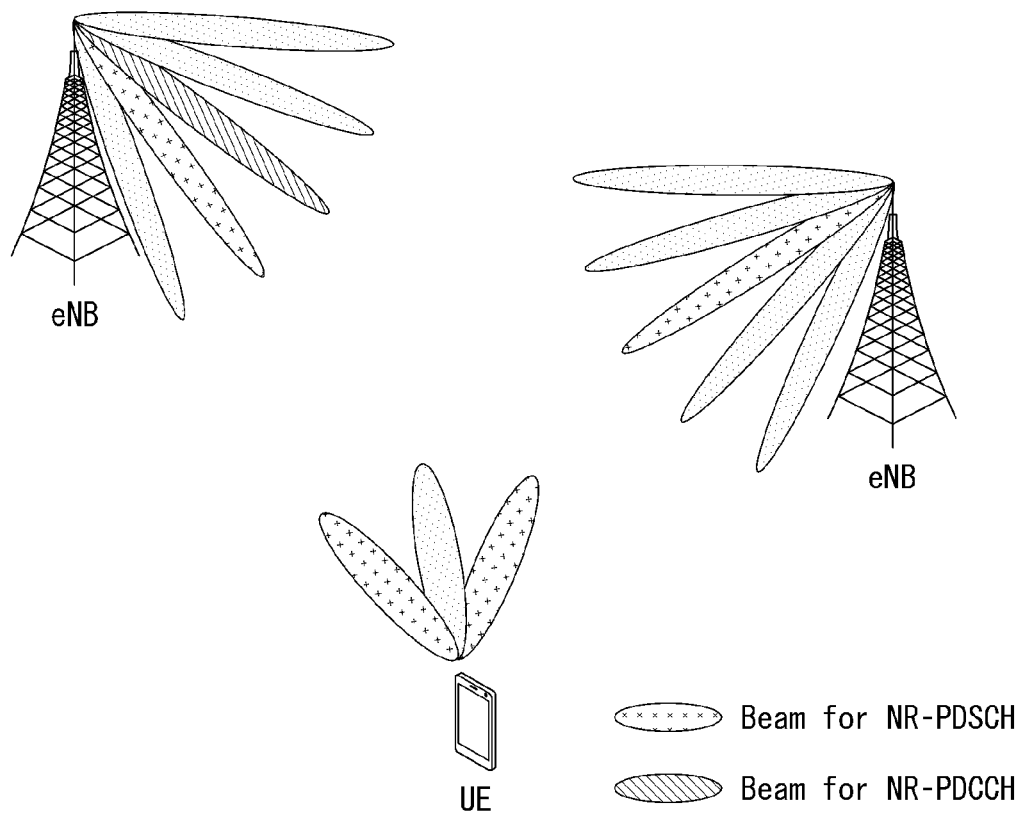

【Figure 11】
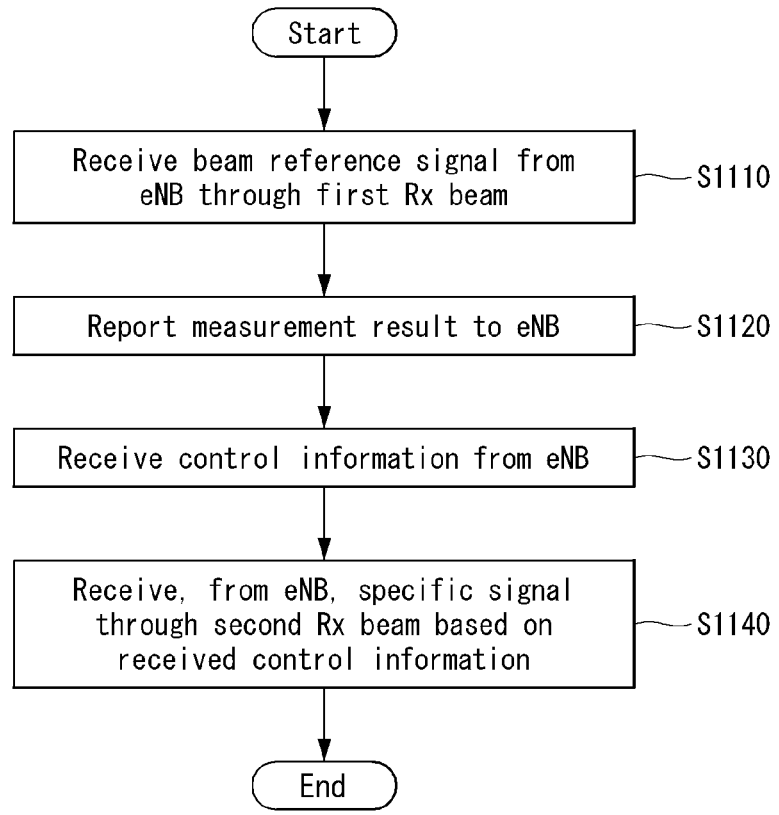
【Figure 12】
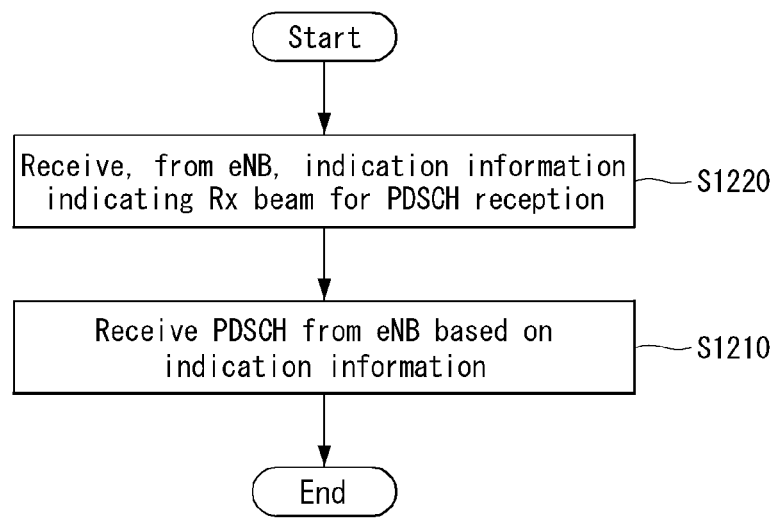

[Figure 13]
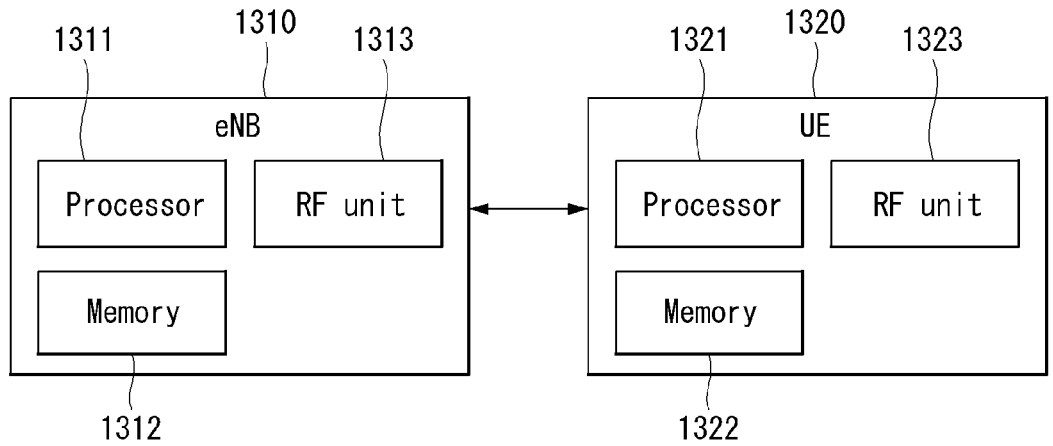
[Figure 14]
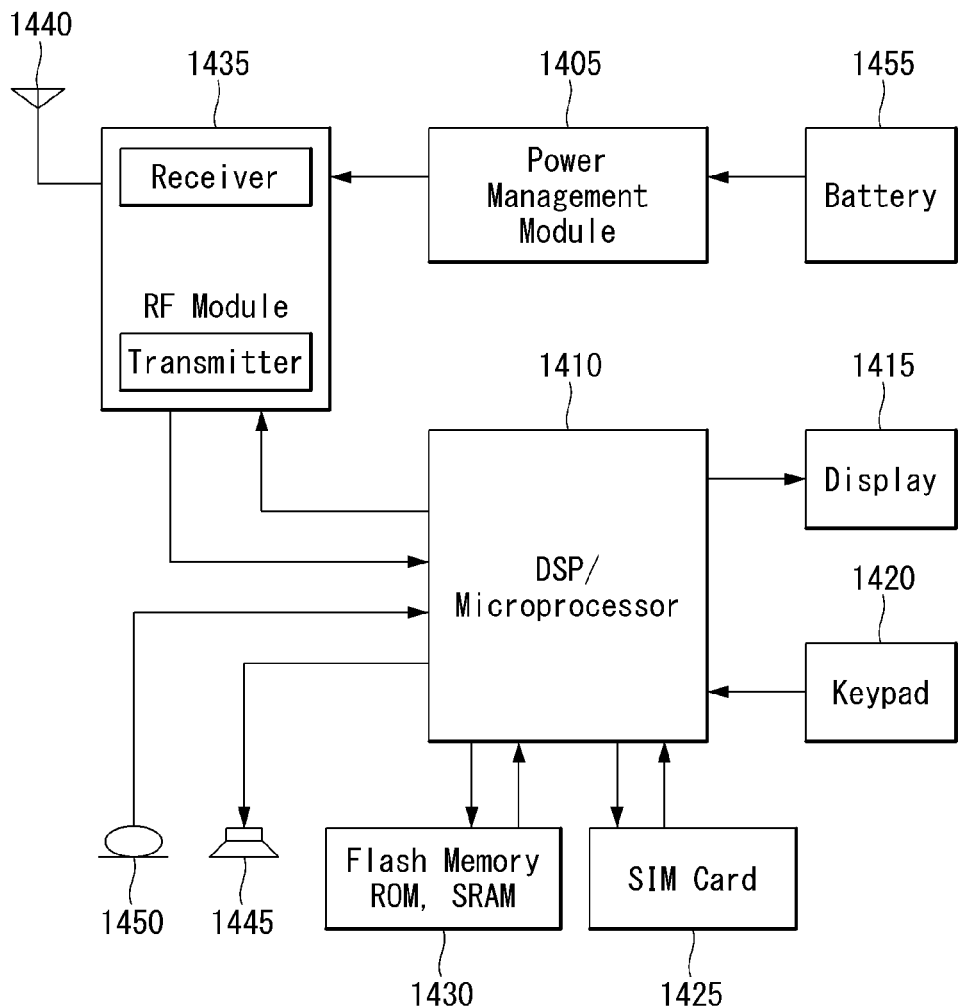

METHOD FOR TRANSMITTING/RECEIVING SIGNALS BY USING BEAMS IN WIRELESS COMMUNICATION SYSTEM, AND DEVICE FOR SAME

CROSS-REFERENCE TO RELATED APPLICATIONS

This application is a continuation application of U.S. patent application Ser. No. 16/475,899, filed on Jul. 3, 2019, which is the National Stage filing under 35 U.S.C. 371 of International Application No. PCT/KR2018/000038, filed on Jan. 2, 2018, which claims the benefit of U.S. Provisional Application No. 62/441,569 filed on Jan. 3, 2017, U.S. Provisional Application No. 62/472,496 filed on Mar. 16, 2017, U.S. Provisional Application No. 62/475,900 filed on Mar. 24, 2017, U.S. Provisional Application No. 62/479,384 filed on Mar. 31, 2017 and U.S. Provisional Application No. 62/521,258 filed on Jun. 16, 2017 the contents of which are all hereby incorporated by reference herein in their entirety.

TECHNICAL FIELD

The present invention relates to a wireless communication system and, more particularly, to a signal transmission and reception method using a beam and an apparatus supporting the same.

BACKGROUND ART

A mobile communication system has been developed to provide a voice service while ensuring an activity of a user. However, in the mobile communication system, not only a voice but also a data service is extended. At present, due to an explosive increase in traffic, there is a shortage of resources and users demand a higher speed service, and as a result, a more developed mobile communication system is required.

Requirements of a next-generation mobile communication system should be able to support acceptance of explosive data traffic, a dramatic increase in per-user data rate, acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

DISCLOSURE

Technical Problem

This specification is to provide a method of transmitting and receiving information on the reception of a beam for receiving a specific signal or a PDCCH.

Furthermore, this specification is to define an operation method of a user equipment depending on whether beam reception information for receiving a PDCCH has been received.

Furthermore, this specification is to define the Rx beam of a user equipment configured for each PDCCH when a plurality of PDCCHs is transmitted and an operation of the user equipment according to the Rx beam.

Furthermore, this specification is to provide a method of transmitting and receiving information related to an Rx beam for receiving a PDSCH.

Technical objects to be achieved in the present invention are not limited to the aforementioned object, and those skilled in the art to which the present invention pertains may evidently understand other technological objects from the following description.

Technical Solution

This specification provides a method of transmitting and receiving signals through at least one reception beam in a wireless communication system signal. The method performed by a user equipment includes receiving, from a base station, a beam reference signal used for beam management through a first reception beam; reporting, to the base station, a measurement result based on the beam reference signal when beam reporting is triggered; receiving, from the base station, control information related to a determination of a second reception beam for receiving a specific signal; and receiving the specific signal through the second reception beam based on the received control information, wherein when a plurality of specific signals is received through different symbols included in a specific time domain, the control information is configured for each specific resource.

Furthermore, in this specification, the specific signal is a physical downlink control channel (PDCCH).

Furthermore, in this specification, the control information indicates a resource quasi co-located (QCL) with a resource of a demodulation reference signal (DMRS) for the PDCCH reception.

Furthermore, in this specification, the resource quasi co-located (QCL) with the resource of the demodulation reference signal (DMRS) for the PDCCH reception is a resource of the beam reference signal.

Furthermore, in this specification, receiving, from the base station, the control information includes receiving, from the base station, information for a given number of beam sets for receiving the PDCCH through first signaling; and receiving, from the base station, information indicating a specific beam set configured for each specific time unit through second signaling.

Furthermore, in this specification, priority is set for each of the given number of beam sets.

Furthermore, in this specification, the specific time domain includes at least one time gap determined by taking into consideration at least one of the decoding time of the control information or beam switching latency between reception beams for the reception of a plurality of the PDCCHs.

Furthermore, this specification further includes transmitting, to the base station, UE capability information indicating a capability of the UE related to the beam switching latency.

Furthermore, this specification further includes receiving, from the base station, information related to the at least one time gap. The information related to the at least one time gap includes at least one of the number of time gaps included in the specific time domain or duration of the time gap.

Furthermore, this specification further includes receiving, from the base station, a confirm message for providing notification of updated information related to a beam if the information related to the beam is updated based on the beam reporting.

Furthermore, in this specification, the control information is represented as a bitmap.

Furthermore, this specification further includes receiving, from the base station, indication information indicating a third reception beam for receiving a physical downlink shared channel (PDSCH); and receiving, from the base station, a physical downlink shared channel (PDSCH) based on the received indication information.

Furthermore, in this specification, the indication information indicates a preconfigured reception beam or indicates a reception beam identical with a second reception beam.

Furthermore, in this specification, the PDSCH is received after a specific offset from timing in which the indication information is received. The specific offset is determined by taking into consideration at least one of a decoding time for the indication information or beam switching latency.

Furthermore, this specification provides a user equipment transmitting and receiving signals through at least one Rx beam in a wireless communication system, including a radio frequency (RF) module configured to transmit and receive radio signals and a processor functionally connected to the RF module. The processor is configured to receive, from a base station, a beam reference signal used for beam management through a first reception beam; report, to the base station, a measurement result based on the beam reference signal when beam reporting is triggered; receive, from the base station, control information related to a determination of a second reception beam for receiving a specific signal; and receive the specific signal through the second reception beam based on the received control information, wherein when a plurality of specific signals is received through different symbols included in a specific time domain, the control information is configured for each specific resource.

The specific resource is a physical downlink control channel (PDCCH).

Advantageous Effects

This specification has an effect in that it can reduce the decoding number of a user equipment by defining contents related to an Rx beam for receiving a specific signal or a PDCCH.

Furthermore, this specification has an effect in that it can prevent a problem in that a payload size increases and latency that may occur for signal transmission and reception by hierarchically transmitting specific information.

Effects which may be obtained in the present invention are not limited to the aforementioned effects, and various other effects may be evidently understood by those skilled in the art to which the present invention pertains from the following description.

DESCRIPTION OF DRAWINGS

The accompany drawings, which are included as part of the detailed description in order to help understanding of the present invention, provide embodiments of the present invention and describe the technical characteristics of the present invention along with the detailed description.

FIG. 1 is a diagram showing an example of a general system structure of NR to which a method proposed in this specification may be applied.

FIG. 2 shows the relation between an uplink frame and a downlink frame in a wireless communication system to which a method proposed in this specification may be applied.

FIG. 3 shows an example of a resource grid supported in a wireless communication system to which a method proposed in this specification may be applied.

FIG. 4 shows examples of a resource grid for each antenna port and numerology to which a method proposed in this specification may be applied.

FIG. 5 shows examples of a connection method of a TXRU and an antenna element.

FIG. 6 shows various shows examples of a service area for each TXRU.

FIG. 7 shows an example of a Tx-Rx beam configuration between an eNB and a user equipment to which a method proposed in this specification may be applied.

FIG. 8 shows an example in which QCL for a new spatial parameter has been configured for each control symbol, which is proposed in this specification.

FIG. 9 is a diagram showing an example in which a time gap has been allocated within a multi-symbol PDCCH, which is proposed in this specification.

FIG. 10 shows an example of a control channel and in which different beams are used for corresponding data channel transmission to which a method proposed in this specification may be applied.

FIG. 11 is a flowchart showing an example of a method of transmitting and receiving a plurality of signals using different Rx beams, which is proposed in this specification.

FIG. 12 is a flowchart showing an example of a method of indicating a PDSCH Rx beam using a physical control channel, which is proposed in this specification.

FIG. 13 illustrates a block diagram of a wireless communication device according to an embodiment of the present invention.

FIG. 14 illustrates a block diagram of a communication device according to an embodiment of the present invention.

MODE FOR INVENTION

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an evolved-NodeB (eNB), a base transceiver system (BTS), or an access point (AP). Furthermore, the terminal may be fixed or may have mobility and may be substituted with another term, such as a user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to a UE, and uplink (UL) means communication from a UE to a base station. In the DL, a transmitter may be part of a base station, and a receiver may be part of a UE. In the UL, a transmitter may be part of a UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

Definition of Terms eLTE eNB: eLTE eNB is the evolution of an eNB which supports a connection to EPC and NGC.

gNB: A node which supports not only a connection to NGC but also NR.

New RAN: A wireless access network which supports NR or E-UTRA or interacts with NGC.

Network slice: A network slice is a network defined by an operator to provide a solution optimized to a specific market scenario requiring specific requirements together with an end-to-end scope.

Network function: A network function is a logical node within network infrastructure having a well-defined external interface and a well-defined functional operation.

NG-C: A control plane interface used for an NG2 reference point between a new RAN and NGC.

NG-U: A user plane interface used for an NG3 reference point between a new RAN and NGC Non-standalone NR: A disposition configuration by which a gNB requires an LTE eNB as an anchor to establish a control plane connection to an EPC or by which a gNB requires an eLTE eNB as an anchor to establish a control plane connection to an NGC.

Non-standalone E-UTRA: A disposition configuration which requires a gNB as an anchor to establish a control plane connection to an NGC.

User plane gateway: An end-point of the NG-U interface.

System in General

FIG. 1 illustrates one example of the overall system structure of an NR to which a method proposed by the present specification may be applied.

Referring to FIG. 1, an NG-RAN is composed of an NG-RA user plane (a new AS sublayer/PDCP/RLC/MAC/PHY) and gNBs providing control plane (RRC) protocol endpoints for User Equipment (UE).

The gNBs are inter-connected through an Xn interface.

The gNBs are also connected to the NGC through the NG interface.

More specifically, the gNBs are connected to Access and Mobility Management Functions (AMFs) through the N2 interface and to User Plane Functions (UPFs) through the N3 interface.

New Rat (NR) Numerology and Frame Structure

In the NR system, a plurality of numerologies may be supported. In this case, the numerology may be defined by a subcarrier spacing and cyclic prefix (CP) overhead. In this case, a plurality of the subcarrier spacing may be derived by scaling a basic subcarrier spacing in integer N (or μ). Furthermore, although it is assumed that a very low subcarrier spacing is not used in a very high carrier frequency, a numerology used may be selected independently of a frequency band.

Furthermore, in the NR system, various frame structures according to a plurality of numerologies may be supported.

Hereinafter, orthogonal frequency division multiplexing (OFDM) numerologies and frame structures which may be taken into consideration in the NR system are described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

In relation to a frame structure of the NR system, the size of various fields in a time domain is represented as a multiple of a time unit of $T_s=1/(\Delta f_{max} \cdot N_f)$. In this case, $\Delta f_{max}=480 \cdot 10^3$ and $N_f=4096$. Downlink and uplink transmission are configured with a radio frame having a period of $T_f=(\Delta f_{max} N_f/100) \cdot T_s=10$ ms. In this case, the radio frame is configured with 10 subframes having a period of each $T_{sf}=(\Delta f_{max} N_f/1000) \cdot T_s=1$ ms. In this case, there may be one set of frames for the uplink and one set of frames for the downlink.

FIG. 2 shows the relation between an uplink frame and a downlink frame in a wireless communication system to which a method proposed in this specification may be applied.

As shown in FIG. 2, the transmission of an uplink frame number i from a user equipment (UE) needs to be started prior to $T_{TA}=N_{TA}T_s$ compared to the start of a corresponding downlink frame in the corresponding UE.

With respect to a numerology μ, slots are numbered in order of higher $n_s^\mu \in \{0, \ldots, N_{subframe}^{slots, \mu}\}$ within a subframe, and the slots are numbered in order of higher $n_{s,f}^\mu \in \{0, \ldots, N_{frame}^{slots, \mu}-1\}$ within a radio frame. One slot is configured with contiguous $N_{symb}^\mu$ OFDM symbols, and $N_{symb}^\mu$ is determined based on a used numerology and slot configuration. The start of a slot $n_s^\mu$ within the subframe is temporally aligned with the start of an OFDM symbol $n_s^\mu N_{symb}^\mu$ in the same subframe.

All UEs cannot perform transmission and reception at the same time, and this means that all the OFDM symbols of a downlink slot or an uplink slot cannot be used.

Table 2 shows the number of OFDM symbols per slot for a normal CP in a numerology μ, and Table 3 shows the number of OFDM symbols per slot for an extended CP in the numerology μ.

TABLE 2

| | | | Slot configuration | | | |
|---|---|---|---|---|---|---|
| | | 0 | | | 1 | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | | | Slot configuration | | | |
|---|---|---|---|---|---|---|
| | | 0 | | | 1 | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

In relation to a physical resource of an NR system, an antenna port, a resource grid, a resource element, a resource block, a carrier part, etc. may be taken into consideration.

Hereinafter, physical resources which may be taken into consideration in the NR system are described specifically.

First, in relation to the antenna port, the antenna port is defined so that a channel on which a symbol on the antenna port is carried is deduced from a channel on which a different symbol on the same antenna port is carried. If the large-scale property of a channel on which a symbol on one antenna port is carried can be deduced from a channel on which a symbol on a different antenna port is carried, the two antenna ports may be said to have a quasi co-located or quasi co-location (QC/QCL) relation. In this case, the large-scale property includes one or more delay spread, Doppler spread, a frequency shift, average received power, or received timing.

FIG. 3 shows an example of a resource grid supported in a wireless communication system to which a method proposed in this specification may be applied.

FIG. 3 illustrates that a resource grid is configured with $N_{RB}^\mu N_{sc}^{RB}$ subcarriers on a frequency domain and one subframe is configured with 14.2μ OFDM symbols, but is not limited thereto.

In an NR system, a transmitted signal is described by one or more resource grids configured with $N_{RB}^\mu N_{sc}^{RB}$ subcarriers and OFDM symbols of $2^\mu N_{symb}^{(\mu)}$. In this case, $N_{RB}^{82} \leq N_{RB}^{max,\mu}$. The $N_{RB}^{max,\mu}$ indicates a maximum transmission bandwidth, which may be different between the uplink and the downlink in addition to between numerologies.

In this case, as in FIG. 4, one resource grid may be configured for each numerology μ and each antenna port p.

FIG. 4 shows examples of a resource grid for each antenna port and numerology to which a method proposed in this specification may be applied.

Each element of the resource grid for a numerology μ and an antenna port p is denoted as a resource element and uniquely identified by an index pair (k,l) In this case, $k=0, \ldots, N_{RB}^\mu N_{sc}^{RB}-1$ is an index on a frequency domain, and $l=0, \ldots, 2^\mu N_{symb}^{(\mu)}-1$ denotes the position of a symbol within a subframe. When a resource element is denoted in a slot, an index pair (k,l) is used. In this case, $l=0, \ldots, N_{symb}^\mu-1$.

The resource element (k,l) for the numerology μ and the antenna port p corresponds to a complex value $a_{k,l}^{(p,\mu)}$. If there is no danger of confusion or if a specific antenna port or numerology is not specified, indices p and μ may be dropped. As a result, a complex value may be $a_{k,l}^{(p)}$ or $a_{k,l}$.

Furthermore, a physical resource block is defined as contiguous subcarriers on a frequency domain. On the frequency domain, physical resource blocks are numbered from 0 to $N_{RB}^\mu-1$. In this case, the relation between a physical resource block number $n_{PRB}$ and resource elements (k,l) on the frequency domain is given as in Equation 1.

$$n_{PRB} = \left\lfloor \frac{k}{N_{sc}^{RB}} \right\rfloor$$ [Equation 1]

Furthermore, in relation to a carrier part, a UE may be configured receive or transmit only a subset of a resource grid. In this case, a set of resource blocks configured to be received or transmitted by the UE is numbered from 0 to $N_{URB}^\mu-1$ on the frequency domain.

Uplink Control Channel

Physical uplink control signaling needs to carry at least hybrid-ARQ acknowledgement, CSI report (including beamforming information, if possible), and a scheduling request.

At least two transmission methods for an uplink control channel supported in an NR system are supported.

An uplink control channel may be transmitted in short duration in the periphery of an uplink symbol(s) transmitted at the last of a slot. In this case, the uplink control channel is time-division-multiplexed and/or frequency-division-multiplexed with an UL data channel within the slot. 1-symbol unit transmission of a slot is supported for an uplink control channel in short duration.

Short uplink control information (UCI) and data are frequency-division-multiplexed in a UE and between UEs if physical resource blocks (PRBs) for short UCI and data do not overlap at least.

In order to support the time division multiplexing (TDM) of short PUCCHs from different UEs within the same slot, a mechanism for notifying a UE of whether a symbol(s) within a slot in which a short PUCCH will be transmitted is supported at least 6 GHz or more is supported.

At least 1) when a reference signal (RS) is multiplexed, UCI and the RS are multiplexed in a given OFDM symbol according to a frequency division multiplexing (FDM) method and 2) a subcarrier spacing between DL/UL data and a PUCCH of short duration in the same slot is the same are supported for 1-symbol duration.

At least, a PUCCH of short duration across 2-symbol duration of a slot is supported. In this case, a subcarrier spacing between DL/UL data and a PUCCH of short duration in the same slot is the same.

At least, a semi-static configuration in which the PUCCH resources of a given UE within a slot, that is, the short PUCCHs of different UEs, can be time-division multiplexed within given duration in the slot is supported.

A PUCCH resource includes a time domain, a frequency domain, and a code domain, if applicable.

A PUCCH of short duration may be extended up to the end of a slot in the UE viewpoint. In this case, after the PUCCH of short duration, an explicit gap symbol is not necessary.

With respect to a slot having a short uplink part (i.e., DL-centric slot), if data is scheduled in the short uplink part, "short UCI" and the data may be frequency-division multiplexed by one UE.

An uplink control channel may be transmitted in long duration over a plurality of uplink symbols in order to improve coverage. In this case, the uplink control channel is frequency-division multiplexed with an uplink data channel within a slot.

UCI carried by a long duration UL control channel may be transmitted in one slot or a plurality of slots, at least, with the design having a low peak to average power ratio (PAPR).

Transmission using a plurality of slots is permitted for total duration (e.g., 1 ms) at least partially.

In the case of a long duration UL control channel, time division multiplexing (TDM) between an RS and UCI is supported for a DFT-S-OFDM.

The long UL part of a slot may be sued for PUCCH transmission of long duration. That is, a PUCCH of long duration is supported for an UL-only slot and all slots having a variable number of symbols configured with a minimum of 4 symbols.

with respect to at least 1- or 2-bit UCI, the UCI may be repeated within N slots (N>1). The N slots may neighbor or may not neighbor in slots in which a PUCCH of long duration is permitted.

At least the simultaneous transmission of a PUSCH and a PUCCH is supported for a long PUCCH. That is, although data is present, uplink control for a PUCCH resource is transmitted. Furthermore, in addition to the PUCCH-PUSCH simultaneous transmission, UCI in a PUSCH is supported.

Intra-TTI slot frequency hopping is supported.

A DFT-s-OFDM waveform is supported.

Transmission antenna diversity is supported.

TDM and FDM between a PUCCH of short duration and a PUCCH of long duration are supported for different UEs in one slot, at least. In a frequency domain, a PRB (or a plurality of PRBs) is a minimum resource unit size for an uplink control channel. If hopping is used, a frequency resource and hopping may not be spread to a carrier bandwidth. Furthermore, a UE-specific RS is used for NR-PUCCH transmission. A set of PUCCH resources is configured by higher layer signaling. The PUCCH resources within the configured set are indicated by downlink control information (DCI).

As part of DCI, timing between data reception and hybrid-ARQ acknowledgement transmission needs to be indicated dynamically (along with at least RRC). A combination of a semi-static configuration and dynamic signaling (for at least some types of UCI information) is used to determine a PUCCH resource for a "long and short PUCCH format." In this case, the PUCCH resource includes a time domain, a frequency domain, and a code domain, if applicable. To use UCI on the PUSCH, that is, to use some of resources for UCI, is supported for the simultaneous transmission of the UCI and data.

Furthermore, at least the uplink transmission of a single HARQ-ACK bit is supported at least. Furthermore, a mechanism that enables frequency diversity is supported. Furthermore, in the case of ultra-reliable and low-latency communication (URLLC), a time interval between scheduling request (SR) resources configured for a UE may be smaller than one slot.

Beam Management

In NR, beam management is defined as follows.

Beam management: a TRP(s) which may be used for DL and UL transmission and reception and/or a set of L1/L2 procedures for obtaining and maintaining a set of UE beams include at least the following contents:

Beam decision: an operation for a TRP(s) or a UE to select its own transmission/Rx beam.

Beam measurement: an operation for a TRP(s) or a UE to measure the characteristics of a received beamforming signal.

Beam reporting: an operation for a UE to report information on a beamformed signal based on beam measurement.

Beam sweeping: an operation of covering a space region using a Tx and/or Rx beam during a time interval according to a pre-determined method.

Furthermore, a Tx/Rx beam correspondence in a TRP and a UE is defined as follows.

A Tx/Rx beam correspondence in a TRP is maintained when at least one of the followings is satisfied.

A TRP may determine a TRP Rx beam for uplink reception based on the downlink measurement of a UE for one or more Tx beams of a TRP.

A TRP may determine a TRP Tx beam for downlink transmission based on the uplink measurement of a TRP for one or more Rx beams of the TRP.

A Tx/Rx beam correspondence in a UE is maintained when at least one of the followings is satisfied.

A UE may determine a UE Tx beam for uplink transmission based on the downlink measurement of a UE for one or more Rx beams of the UE.

A UE may determine a UE Rx beam for downlink reception based on the indication of a TRP based on uplink measurement for one or more Tx beams.

The capability indication of UE beam correspondence-related information is supported for a TRP.

The following DL L1/L2 beam management procedure is supported within one TRP or a plurality of TRPs.

P-1: this is used to enable UE measurement for different TRP Tx beams in order to support the selection of a TRP Tx beam/UE Rx beam(s).

In general, beamforming in a TRP includes intra/inter-TRP Tx beam sweep in different beam sets. For beamforming in a UE, it commonly includes UE Rx beam sweep from a set of different beams.

P-2: UE measurement for different TRP Tx beams is used to change an inter/intra-TRP Tx beam(s).

P-3: if a UE uses beamforming, UE measurement for the same TRP Tx beam is used to change a UE Rx beam.

Aperiodic reporting (aperiodic reporting) triggered by at least a network is supported in P-1-, P-2- and P-3-related operations.

UE measurement based on an RS for beam management (at least a CSI-RS) is configured with K (a total number of beams) beams. A UE reports a measurement result of selected N Tx beams. In this case, N is not an essentially fixed number. A procedure based on an RS for a mobility object is not excluded. Reporting information includes at least a measurement quantity for an N beam(s) and information indicating an N DL Tx beam when N<K. Particularly, a UE may report a CSI-RS resource indicator (CRI) of N' with respect to K'>1 non-zero power (NZP) CSI-RS resources.

A UE may be configured with the following higher layer parameters for beam management.

N≥1 reporting setting, M≥1 resource setting

Links between reporting settings and resource settings are configured in an agreed CSI measurement configuration.

P-1 and P-2 based on a CSI-RS are supported as resource and reporting settings.

P-3 may be supported regardless of whether a reporting setting is present.

Reporting setting including at least the following contents

Information indicating a selected beam

L1 measurement reporting

A time domain operation (e.g., aperiodic operation, a periodic operation, a semi-persistent operation)

Frequency granularity when several frequency granularities are supported

Resource setting including at least the following contents

A time domain operation (e.g., an aperiodic operation, a periodic operation, semi-persistent operation)

RS type: at least an NZP CSI-RS

At least one CSI-RS resource set. Each CSI-RS resource set may include k≤1 CSI-RS resources (some parameters of K CSI-RS resources may be the same. For example, a port number, a time domain operation, density and a period)

Furthermore, NR supports the following beam reporting by taking into consideration an L group where L>1.

Information indicating a minimum group

A measurement quantity for an N1 beam (support L1 RSRP and CSI report (if a CSI-RS is for CSI acquisition))

If applicable, information indicating $N_I$ DL Tx beams

Group-based beam reporting, such as that described above, may be configured in a UE unit. Furthermore, the group-based beam reporting may be turned off in a UE unit (e.g., when L=1 or $N_I$=1).

NR supports that a UE can trigger a mechanism for recovery from a beam failure.

A beam failure event occurs when the quality of a beam pair link of an associated control channel is sufficient low (e.g., a comparison with a threshold and the timeout of an associated timer). The mechanism for recovery from a beam failure (or obstacle) is triggered when a beam obstacle occurs.

A network explicitly configures a resource for transmitting an UL signal with respect to a UE for a recovery object. The configuration of resources is supported at the place where an eNB listens to the resources from all or some of directions (e.g., random access region).

An UL transmission/resource reporting a beam obstacle may be positioned at the same time instance as that of a PRACH (resource orthogonal to a PRACH resource) or at time instance (configurable for a UE) different from that of a PRACH. The transmission of a DL signal is supported so that a UE can monitor a beam in order to identify new potential beams.

NR supports beam management regardless of beam-related indication. If beam-related indication is provided, information on a UE-side beamforming/reception procedure used for CSI-RS-based measurement may be indicated for a UE through QCL. Parameters for delay, Doppler, and an average gain used in the LTE system and a spatial parameter for beamforming in a receiver will be added as a QCL parameter to be supported in NR. The QCL parameter may include a parameter related to an angle of arrival in a UE Rx beamforming viewpoint and/or parameters related to an angle of departure in an eNB Rx beamforming viewpoint.

NR supports that the same or different beams are used for control channel and corresponding data channel transmission.

For NR-PDCCH transmission supporting the robustness of beam pair link blocking, a UE may be configured to monitor NR-PDCCHs on an M-beam pair link at the same time. In this case, a maximum value of M≥1 and M may depend on at least UE capability.

A UE may be configured to monitor an NR-PDCCH on a different beam pair link(s) in different NR-PDCCH OFDM symbols. A parameter related to UE Rx beam setting for monitoring an NR-PDCCH on a plurality of beam pair links is configured by higher layer signaling or a MAC CE and/or is taken into consideration in the search space design.

At least, NR supports the indication of a spatial QCL assumption between a DL RS antenna port(s) and a DL RS antenna port(s) for the demodulation of a DL control channel. A candidate signaling method for beam indication for an NR-PDCCH (i.e., a configuration method of monitoring an NR-PDCCH) includes MAC CE signaling, RRC signaling, DCI signaling, a spec. transparent and/or implicit method, and a combination of the signaling methods.

For the reception of a unicast DL data channel, NR supports the indication of a spatial QCL assumption between a DL RS antenna port and the DMRS antenna port of a DL data channel.

Information indicating an RS antenna port is indicated through DCI (downlink permission). Furthermore, the information indicates an RS antenna port QCLed with a DMRS antenna port. A different set of DMRS antenna ports for a DL data channel may be indicated as QCL with a different set of RS antenna ports.

Hereinafter, prior to the detailed description of methods proposed in this specification, contents related to the methods proposed in this specification directly/indirectly are first described in brief.

In next-generation communication, such as 5G or New Rat (NR), as more communication devices require a higher communication capacity, there is a need for enhanced mobile broadband communication compared to the existing radio access technology (RAT).

Furthermore, massive machine type communications (MTC) that provides various services anywhere and at any time by connecting a plurality of devices and things is also one of important issues that may be taken into consideration in the next-generation communication.

Furthermore, the design or structure of a communication system in which service and/or a UE sensitive to reliability and latency are taken into consideration is discussed.

As described above, the introduction of the next-generation radio access technology (RAT) in which enhanced mobile broadband (eMBB) communication, massive MTC (mMTC), and ultra-reliable and low latency communication (URLLC) are taken into consideration is being discussed. In this specification, the corresponding technology is generally called "new RAT (NR)", for convenience sake.

OFDM Numerology in NR

A new RAT system uses an OFDM transmission method or a transmission method similar to the method, and has an OFDM numerology of Table 4 representatively.

That is, Table 4 shows an example of OFDM parameters of a New RAT system.

TABLE 4

| Parameter | Value |
| --- | --- |
| Subcarrier-spacing (Δf) | 60 kHz |
| OFDM symbol length | 16.33 us |
| Cyclic Prefix (CP) length | 1.30 us/1.17 us |
| System BW | 80 MHz |
| No. of available subcarriers | 1200 |
| Subframe length | 0.25 ms |
| Number of OFDM symbol per Subframe | 14 symbols |

Analog Beamforming

In a millimeter wave (mmW), multiple antenna elements may be installed in the same area because a wavelength is short.

That is, in a 30 GHz band, a wavelength is 1 cm, and a total of 64 (8×8) antenna elements may be installed in a panel of 4×4 cm at intervals of 0.5 lambda (wavelength) in a 2-dimensional array form.

Therefore, in mmW, coverage is increased or throughput is improved by raising a beamforming (BF) gain using multiple antenna elements.

In this case, if each antenna element has a transceiver unit (TXRU) so that transmission power and a phase can be adjusted, independent beamforming is possible for each frequency resource.

However, there is a problem in that effectiveness is low in terms of the price if TXRUs are installed in all of 100 antenna elements.

Therefore, a method of mapping multiple antenna elements to one TXRU and adjusting the direction of a beam using an analog phase shifter is taken into consideration.

Such an analog beamforming method has a disadvantage in that it cannot perform frequency-optional beamforming because only one beam direction can be formed in a full band.

For this reason, hybrid BF (HBF) having the number of BTXRUs smaller than Q antenna elements in the middle form of digital BF and analog BF may be taken into consideration.

HBF is different depending on a method of connecting B TXRUs and Q antenna elements, but the direction of beams that may be transmitted at the same time is limited to B or less.

FIG. 5 shows examples of a connection method of a TXRU and an antenna element.

In this case, a TXRU virtualization model shows the relation between the output signal of a TXRU and the output signals of antenna elements.

FIG. 5a shows an example of a method of connecting a TXRU to a sub-array.

Referring to FIG. 5a, an antenna element is connected to only one TXRU. Unlike FIG. 5a, FIG. 5b shows a method of connecting TXRUs to all antenna elements.

That is, in the case of FIG. 5b, the antenna elements are connected to all TXRUs.

In FIG. 5, W indicates a phase vector multiplied by an analog phase shifter.

That is, the direction of analog beamforming is determined by W. In this case, mapping between CSI-RS antenna ports and TXRUs may be 1-to-1 or 1-to-many.

Reference Signal (RS) Virtualization

In mmW, PDSCH transmission is possible in one analog beam direction at one timing by analog beamforming.

Therefore, an eNB transmits data to only some UEs in a specific direction.

Accordingly, data transmission may be performed to a plurality of UEs in several analog beam directions at the same time by differently configuring analog beam directions for each antenna port, if necessary.

FIG. 6 shows various shows examples of a service region for each TXRU.

FIG. 6 shows an example of a structure in which 256 antenna elements are equally divided into four parts to form four sub-arrays and a TXRU is connected to each sub-array.

If each sub-array is configured with a total of 64 (8×8) antenna elements in a 2-dimensional array form, a region corresponding to a horizontal angle region of 15 degrees and a vertical angle region of 15 degrees may be covered by specific analog beamforming.

That is, a region that needs to be served by an eNB is divided into multiple regions, and the regions are served one by one at once.

In the following description, it is assumed that a CSI-RS antenna port and a TXRU are 1-to-1 mapped.

Accordingly, an antenna port and a TXRU may be construed as having the same meaning.

As in FIG. 6a, if all TXRUs (antenna ports, sub-array) have the same analog beamforming direction, the throughput of a corresponding region may be increased by forming a digital beam having higher resolution.

Furthermore, the throughput of a corresponding region may be increased by increasing the rank of transmission data to the corresponding region.

Furthermore, as in FIG. 6b, if each TXRU (antenna port, sub-array) has a different analog beamforming direction, UEs distributed to a wider area can transmit data at the same time in a corresponding subframe (SF).

As shown in FIG. 6b, two of four antenna ports are used by a UE1 in a region 1 for PDSCH transmission, and the remaining two thereof is used by a UE2 in a region 2 for PDSCH transmission.

Furthermore, FIG. 6b shows an example in which a PDSCH 1 transmitted to the UE1 and a PDSCH 2 transmitted to the UE2 has been spatial-division multiplexed (SDM).

In contrast, as in FIG. 6c, the PDSCH 1 transmitted to the UE1 and the PDSCH 2 transmitted to the UE2 may be frequency-division multiplexed (FDM) and transmitted.

From among a method of providing service to one region using all antenna ports and a method of dividing antenna ports and serving several regions at the same time, a preferred method may be different depending on a rank and MCS served to a UE in order to maximize cell throughput.

Furthermore, a preferred method is different depending on the amount of data to be transmitted to each UE.

An eNB calculates a cell throughput or scheduling metric which may be obtained when one region is served using all antenna ports, and calculates a cell throughput or scheduling metric which may be obtained when antenna ports are divided and two regions are served.

An eNB selects the final transmission method by comparing the cell throughputs or scheduling metrics which may be obtained through the two methods.

As a result, the number of antenna ports participating in PDSCH transmission in an SF-by-SF is different.

An eNB calculates the transmission MCS of a PDSCH according to the number of antenna ports, and requires suitable CSI feedback from a UE in order to incorporate the CSI feedback into a scheduling algorithm.

CSI Feedback

In the 3GPP LTE (-A) system, it has been defined that a UE reports channel state information (CSI) to a BS.

In this case, the channel state information (CSI) generally refers to information which may indicate the quality of a radio channel (or also called a "link") formed between the UE and an antenna port.

For example, a rank indicator (RI), a precoding matrix indicator (PMI), or a channel quality indicator (CQI) corresponds to the information.

In this case, the RI indicates rank information of a channel. This means the number of streams received by a UE through the same time-frequency resource. The value is determined by long-term fading of a channel, and is fed back from a UE to a BS with a longer period than the PMI or CQI.

The PMI is a value into which channel spatial characteristics have been incorporated, and indicates a precoding index preferred by a UE based on metric, such as an SINR.

The CQI is a value indicating the intensity of a channel. In general, the CQI means a received SINR which may be obtained when a BS uses a PMI.

In the 3GPP LTE (-A) system, a BS may configure multiple CSI processes for a UE, and may receive reporting for CSI for each process.

In this case, the CSI process is configured with a CSI-RS for specifying signal quality from the BS and a CSI-interference measurement (CSI-IM) resource for interference measurement.

Tx-Rx Beam Association

A network may transmit a known signal (e.g., a measurement reference signal (MRS), a beam reference signal (BRS), or a beamformed channel state information reference signal (CSI-RS) to which each beam has been applied in order for a UE to perform measurement on beams to be used in a corresponding cell (or may be used by an eNB), which is hereinafter generally called a "BRS", for convenience of description) aperiodically/periodically.

Furthermore, a UE may select an eNB Tx beam suitable for the UE through the measurement of a BRS.

If up to the Rx beam of a UE is taken into consideration, the UE may perform measurement using different Rx beams, and may select a beam combination(s) by taking into consideration the Tx beam of an eNB and the Rx beam of the UE.

After such a process is performed, the Tx-Rx beam association of the eNB and the UE may be determined explicitly or implicitly.

(1) Network Decision Based Beam Association

A network may indicate that a UE reports a higher XTx-Rx beam combination as a measurement result with respect to the UE. In this case, the number of reported beam combinations may be pre-defined or may be signaled by the network (through high layer signaling) or all of beam combinations in which the measurement result exceeds a specific threshold may be reported.

In this case, the specific threshold may be pre-defined or may be signaled by the network. If each UE has different decoding performance, a category may be defined by taking into consideration the decoding performance of the UE, and a threshold for each category may be defined.

Furthermore, reporting on a beam combination may be performed by the indication of a network periodically and/or aperiodically. Alternatively, if a previous report result and a current measurement result vary by a given level or higher, event-triggered reporting may be performed. In this case, the given level may be pre-defined or may be signaled by a network (through high layer signaling).

A UE may report (one or a plurality of) beam associations determined by the above-described method. If a plurality of beam indices is reported, priority may be assigned to each beam. For example, the beam indices may be reported so that they are interpreted in a form, such as the first ($1^{st}$) preferred beam and the second ($2^{nd}$) preferred beam.

(2) UE Decision Based Beam Association

In the UE decision based beam association, the preferred beam reporting of a UE may be performed using the same method as the above-described explicit beam association.

Rx Beam Assumption for the Measurement

Additionally, the best beam(s) reported by a UE may be a measurement result when one Rx beam is assumed or may be a measurement result when a plurality of Rx beams is assumed. The assumption of an Rx beam may be configured by a network.

For example, if a network has indicated that three measurement results should be reported assuming one Rx beam, a UE may perform measurement using all Rx beams, may select the best (eNB) Tx beam of the measurement results, and may report the $1^{st}$, $2^{nd}$, $3^{rd}$ best results among measurement results according to an Rx beam used for a corresponding Tx beam measurement.

Furthermore, a reported measurement result may be limited to exceed a specific threshold. For example, if a beam having a measurement value (may be pre-defined or set by a network) exceeding a specific threshold, among the $1^{st}$, $2^{nd}$, $3^{rd}$ best beams measured by a UE using a specific Rx beam, is only the 1st best beam, the UE may report only the $1^{st}$ best beam to a BS.

Quasi Co-Location (QCL)

A method of demodulating, by a UE, data (e.g., PDSCH) as a UE-specific RS, such as a specific DMRS, when the UE receives the data is taken into consideration. Such a DMRS is transmitted with respect to only a scheduled RB(s) of a corresponding PDSCH and is transmitted for only a time period in which a scheduled PDSCH is transmitted. Accordingly, there may be a limit to reception performance in performing channel estimation using only a corresponding DMRS itself.

For example, in performing channel estimation, an estimation value of a major large-scale parameter (LSP) of a radio channel is necessary. DMRS density may be insufficient in obtaining the estimation value using only a DMRS present in a time/frequency domain in which a scheduled PDSCH is transmitted.

Accordingly, in order to support such an implementation of a UE, LTE-A supports methods of defining the following quasi co-location signaling/assumption/behaviors between RS ports and configuring/operating a UE based on the quasi co-location signaling/assumption/behavior.

That is, if the large-scale characteristic of a channel in which a symbol on one antenna port is transmitted can be deduced from a channel in which a symbol on a different antenna port is transmitted, the two antenna ports are said to have been quasi co-located (QCL).

In this case, the large-scale characteristic includes one or more of delay spread, Doppler spread, a Doppler shift, an average gain or an average delay.

Furthermore, a UE may assume the antenna ports 0 to 3, and an antenna port for the primary/secondary sync signal of a serving cell has been QCLed with a Doppler shift and average delay.

Physical Downlink Shared Channel (PDSCH) Resource Mapping Parameters

A UE configured with the transmission mode 10 for a given serving cell may be configured up to 4 parameter sets by higher layer signaling in order to decode a PDSCH according to a detected PDCCH/EPDCCH having DCI format 2D intended by the UE and the given serving cell. In order to determine PDSCH RE mapping and if the UE has been configured as a Type B QCL type, the UE will use a parameter configured based on a value of a "PDSCH RE Mapping and Quasi-Co-Location indicator" field in the PDCCH/EPDCCH having the DCI format 2D in order to determine a PDSCH antenna port QCL.

In the case of a PDSCH not having a corresponding PDCCH/EPDCCH, the UE will use a parameter set indicated in a PDCCH/EPDCCH having a DCI format 2D corresponding to associated SPS activation in order to determine the PDSCH RE mapping and the PDSCH antenna port QCL.

Table 5 shows PDSCH RE mapping and Quasi-Co-Location Indicator fields in the DCI format 2D.

TABLE 5

| Value of "PDSCH RE Mapping and Quasi-Co-Location Indicator" field | Description |
| --- | --- |
| "00" | Parameter set 1 configured by higher layers |
| "01" | Parameter set 2 configured by higher layers |
| "10" | Parameter set 3 configured by higher layers |
| "11" | Parameter set 4 configured by higher layers |

The following parameters for determining the PDSCH RE mapping and the PDSCH antenna port QCL are configured through higher layer signaling for each parameter set:
crs-PortsCount-r11
crs-FreqShift-r11
mbsfn-SubframeConfigList-r11
csi-RS-ConfigZPId-r11
pdsch-Start-r11
qcl-CSI-RS-ConfigNZPId-r11
If a UE is configured as a higher layer parameter eMIMO-Type for a TDD serving cell, zeroTxPowerCSI-RS2-r12
Antenna Port QCL for PDSCH A UE configured as the transmission modes 8-10 of a serving cell may assume that the antenna ports 7-14 of the serving cell are QCL with a given subframe with respect to delay spread, Doppler spread, a Doppler shift, an average gain and average delay.

A UE configured as the transmission modes 1-9 of a serving cell may assume that the antenna ports 0-3, 5, 7-30 of the serving cell are QCL with respect to Doppler shift, Doppler spread, average delay, and delay spread.

A UE configured as the transmission mode 10 of a serving cell is configured as one of 2 QCL types for the serving cell according to a higher layer parameter QCL operation in order to decode a PDSCH using a transmission method related to the antenna ports 7-14:

Type A: a UE may assume that the antenna ports 0-3, 7-30 of a serving cell are QCL with respect to delay spread, Doppler spread, Doppler shift, and average delay.

Type B: a UE may assume that the antenna ports 15-30, corresponding to a CSI-RS resource configuration identified by a higher layer parameter qcl-CSI-RS-ConfigNZPId-r11, and the antenna ports 7-14 associated with a PDSCH are QCL with respect to Doppler shift, Doppler spread, average delay, and delay spread.

In the case of an LAA Scell, a UE does not expect that the LAA Scell will be configured as a QCL type B.

Channel-State Information-Reference Signal (CSI-RS) Definition

With respect to a serving cell and a UE configured as the transmission mode 9 and not configured as a higher layer parameter eMIMO-Type, the UE may be configured as one CSI-RS resource configuration.

With respect to a serving cell and a UE which has been configured as the transmission mode 9 and configured as a higher layer parameter eMIMO-Type and in which eMIMO-Type has been set as "Class A", the UE may be configured as one CSI-RS resource configuration.

With respect to a serving cell and a UE which has been configured as the transmission mode 9 and configured as a higher layer parameter eMIMO-Type and in which eMIMO-Type has been set as "Class B", the UE may be configured as one or more CSI-RS resource configuration.

With respect to a serving cell and a UE configured as the transmission mode 10, the UE may be configured as one or more CSI-RS resource configuration(s). The following parameters whose non-zero transmission power needs to be assumed by a UE with respect to a CSI-RS is configured through higher layer signaling for each CSI-RS resource configuration:

When a UE is configured as the transmission mode 10, a CSI-RS resource configuration identity
The number of CSI-RS ports
CSI RS configuration
CSI RS subframe configuration $I_{CSI-RS}$
If a UE has been configured as the transmission mode 9, a UE assumption for reference PDSCH transmission power $P_c$ for CSI feedback
If a UE has been configured as the transmission mode 10, a UE assumption for reference PDSCH transmission power $P_c$ for CSI feedback with respect to each CSI process
If CSI subframe sets $C_{CSI,0}$ and $C_{CSI,1}$ have been configured as higher layer signaling with respect to one CSI process, $P_c$ is configured with respect to each CSI subframe set of a corresponding CSI process.
Pseudo-random sequence generator parameter $n_{ID}$
If a UE is configured as a higher layer parameter eMIMO-Type and the eMIMO-Type is set as "Class A" with respect to a CSI process, a CDM type parameter.
If a UE has been configured as the transmission mode 10, a UE assumption of a higher layer parameter qcl-CRS-Info-r11CRS for the QCL type B, a CRS antenna port and CSI-RS antenna ports having the following parameters:
qcl-ScramblingIdentityq-r11.
crs-PortsCount-r11.
mbsfn-SubframeConfigList-r11.

$P_c$ is an assumed ratio of a PDSCH EPRE to a CSI-RS EPRE when a UE derives CSI feedback and takes a value of a [−8, 15] dB range as a 1-dB step size.

In this case, the PDSCH EPRE corresponds to symbols in which the ratio of the PDSCH EPRE and cell a specific RS EPRE is indicated as PA.

A UE does not expect a configuration of a CSI-RS and a PMCH in the same subframe of a serving cell.

With respect to a frame structure type 2 serving cell and 4 CRS ports, a UE does not expect that it will receive a CSI-RS configuration index belonging to sets [20-31] for a normal CP case or sets [16-27] for an extended CP case.

A UE may assume that the CSI-RS antenna port of a CSI-RS resource configuration is QCL with respect to delay spread, Doppler spread, Doppler shift, average gain, and average delay.

A UE configured as the transmission mode 10 and the QCL type B may assume that the antenna ports 0 to 3, associated with qcl-CRS-Info-r11 corresponding to a CSI-RS resource configuration, and the antenna ports 15 to 30 corresponding to a CSI-RS resource configuration are QCL with respect to Doppler shift and Doppler spread.

A UE which has been configured as the transmission mode 10 and configured as a higher layer parameter eMIMO-Type and in which eMIMO-Type is set as "Class B" and the number of configured CSI resources is one greater than one CSI process and which has the QCL type B does not expect that it will receive a CSI-RS resource configuration for a CSI process having a different value of a higher layer parameter qcl-CRS-Info-r11.

A BL/CE UE configured as CEModeA or CEModeB does not expect that it will be configured as a non-zero transmission power CSI-RS.

Assumptions Independent of Physical Channel

A UE does not assume that two antenna ports are QCL, unless described otherwise.

A UE may assume that the antenna ports 0 to 3 of a serving cell are QCL with respect to delay spread, Doppler spread, Doppler shift, average gain, and average delay.

For the purpose of discovery signal-based measurement, a UE does not assume the presence of a different signal or physical channel other than a discovery signal.

If a UE supports discoverySignalsInDeactSCell-r12, the UE has been configured as discovery signal-based RRM measurement in a carrier frequency that may be applied to a secondary cell in the same carrier frequency, the secondary cell has been deactivated, and the UE has not been configured by a higher layer in order to receive an MBMS in the secondary cell, an activation command for a PSS, SSS, PBCH, CRS, PCFICH, PDSCH, PDCCH, EPDCCH, PHICH, DMRS and a CSI-RS other than discovery signal transmission is not transmitted by the secondary cell up to a subframe received with respect to the secondary cell.

In the above-described operation, for example, in the case of a UE configured as the QCL Type B, in order to receive help for the channel estimation of a DMRS transmitted along with a scheduled PDSCH, the UE is limited to use LSPs estimated from a specific QCLed CSI-RS resource indicated in corresponding scheduling DCI.

In the new RAT (NR) environment taken into consideration in this specification, however, an aperiodic CSI-RS transmission method in the aspect that a CSI-RS itself is transmitted only when it deviates from a conventional periodic form is taken into consideration. Accordingly, there is a problem in that RS density to be use as a QCL CSI-RS may be sufficiently insufficient compared to a conventional technology.

At least one of the followings may be defined/configured as QCL parameters taken into consideration in the NR environment:

Delay spread
Doppler spread
Doppler shift
Average gain
Average delay
Average angle (AA)

This may mean that, for example, an Rx beam direction (and/or Rx beam width/sweeping degree) when a transmission signal from other antenna port(s) is received based on an AA estimated from a specific antenna port(s) is configured to be the same or similar (in association with this) and reception processing is possible (meaning that reception performance when an operation is performed as described above is guaranteed to be a specific level or more) between antenna ports whose QCL is guaranteed in the AA viewpoint.

The AA may also be represented as a name, such as an "(almost) dominant arrival angle", for example.

As a result, if a specific dominant (arrival) angle S of a signal measured from a specific antenna port is present, a specific dominant (arrival) angle of a signal measured from another antenna port capable of QCL assumption with the specific dominant (arrival) angle S may have a meaning that it is "almost" similar to the S.

That is, if such a QCL assumption is possible, this means that a receiver can use/apply an AA, estimated from a specific indicated QCLed RS/SS, to reception processing "almost" without any change. Accordingly, there is an advantage in that the efficient implementation/operation of a receiver are made possible.

Angular Spread (AS):

QCL in an AS aspect between two antenna ports means that an AS estimated from one port may be derived or estimated or applied from an AS estimated from another port.

In this case, the AS may be separately defined for each specific dimension as an azimuth and/or a zenith AS or may be defined together. Furthermore, in the departure and/or arrival aspect, the AS may be defined separately or together.

This may mean that, for example, an Rx beam width/sweeping degree (and/or Rx beam direction) when a transmission signal from other antenna port(s) is received based on an AA estimated from a specific antenna port(s) is configured to be the same or similar (in association with this) and reception processing is possible (meaning that reception performance when an operation is performed as described above is guaranteed to be a specific level or more) between antenna ports whose QCL is guaranteed in the AA viewpoint.

That is, if the AA has a characteristic meaning an average and the (most) effective/dominant beam direction, the AS may be interpreted as a parameter regarding that how much is the beam direction spread and received by a radiator distribution (based on/with reference to the AA).

The New RAT (NR) has an advantage in that it can obtain a beamforming gain using a narrow analog beam, but has a disadvantage in that it can support only a UE present within a specific direction per time instance (e.g., symbol, slot, subframe).

The same problem is present in terms of a receiver that receives a signal in addition to a transmitter that transmits the signal. Accordingly, performance degradation may occur if beam association between Tx and Rx is inaccurate.

FIG. 7 shows an example of a Tx-Rx beam configuration between an eNB and a UE to which a method proposed in this specification may be applied.

As shown in FIG. 7, it is assumed that an eNB can configure (M+1) Tx (analog) beams (Tx beam #0, . . . , Tx beam #M) and a UE can configure (N+1) Rx (analog) beams (Rx beam #0, Rx beam #N).

In FIG. 7, in Tx-Rx beam setting between the eNB and the UE, reception performance may be increased when the UE receives a signal based on the Tx beam #2 of the eNB using the Rx beam #2.

In contrast, regarding a signal transmitted by the Tx beam #2, reception performance is reduced or not detected in an Rx beam except the Rx beam #2.

Accordingly, if the eNB and the UE transmit and receive PDCCHs using only a (Tx-Rx) beam combination having the best reception performance through measurement, the UE may not detect the PDCCH due to a sudden change in the channel environment, such as UE mobility, rotation, or blockage.

The eNB may be aware of such a situation using an implicit or explicit method as in the following four examples.

That is, the following four examples show examples in which the eNB can be aware of the PDCCH detection failure of the UE using an implicit or explicit method.

The first is the case where the eNB has transmitted a DL grant to the UE, but has not received acknowledgement (Ack) or non-acknowledgement (Nack) from the corresponding UE.

The second is the case where the eNB has transmitted an UL grant to a UE, but has not received UL data from the corresponding UE.

The third is the case where if channel reciprocity is established, UL Tx-Rx beam quality measurement is possible through UL RS measurement and DL Tx-Rx beam quality can be aware through the UL Tx-Rx beam quality measurement.

The fourth is the case where the eNB can be aware of the current DL Tx-Rx beam quality through the aperiodic or periodic beam reporting (of the UE).

Accordingly, this specification proposes a method of transmitting and receiving robust PDCCHs in order to solve the PDCCH detection failure of a UE attributable to a sudden change in the channel environment.

First, a method of indicating QCL regarding a new spatial parameter for PDCCH reception proposed in this specification is described.

In this specification, as described above, it is assumed that a Tx-Rx beam association has been previously performed and a network (NW) is aware of information on the best beams of a corresponding UE through a UE beam report.

The NW may previously signal to each UE for a subframe set in which each UE has to perform blind decoding on a control channel (through a master information block (MIB), a system information block (SIB) or RRC signaling) based on the beam report of the UE.

For the Rx beam configuration of the UE for PDCCH decoding in the subframe set, the NW may configure QCL for a new spatial parameter (e.g., dominant arrival angle) and notify the UE of the QCL as described above.

In this case, the new spatial parameter may mean information indicating that the resource of a DMRS for the PDCCH decoding has been QCLed with the resource of a BRS.

That is, the new spatial parameter may be interpreted as information indicating the resource of a DMRS for the PDCCH decoding QCLed with the resource of a BRS (antenna port, etc.) or information indicating the resource of a BRS QCLed with the resource of a DMRS for the PDCCH decoding.

For example, the UE may decode the PDCCH in a corresponding BRS Rx beam direction based on information (i.e., a new spatial parameter) indicating that a specific BRS (or MRS or CSI-RS) and a DMRS for PDCCH demodulation have been QCLed in a dominant arrival angle (DAA) viewpoint.

That is, the new spatial parameter may be a parameter that enables an Rx beam (of the UE) for the PDCCH decoding to be aware through the Rx beam of a BRS.

Accordingly, the UE may decode the PDCCH through the Rx beam indicated by the new spatial parameter (or having a QCL relation with the UE Rx beam for the BRS).

An NW may define a plurality of control symbols within one subframe, and may broadcast the control symbols within a cell or may indicate the number of corresponding control symbols with respect to a UE through higher layer signaling (or may notify the UE of the number of control symbols through a physical channel as in a physical control format indicator channel (PCFICH) in LTE).

In other words, the NW may signal the number of control symbols per subframe in a given period or aperiodically.

This may mean that the NW allocates a different number of control symbols for each subframe (set).

If a variation for a channel environment with a corresponding UE is low and a reception signal in the UE is strong, a NW may indicate only one control symbol with respect to the UE.

In this case, a PDCCH may be transmitted only in the first symbol of a subframe (set), and a PDSCH may be transmitted from the second symbol.

In this case, the UE may perform a blind decoding operation on the PDCCH by applying a different Rx beam or the same Rx beam for each control symbol.

As another meaning, it may be interpreted that if the UE performs bind decoding by applying a different Rx beam, a search space in which the different Rx beam is assumed for each control symbol is defined.

A method of receiving, by a UE, a PDCCH and/or a PDSCH is described below through various embodiments.

First, (1) a method of blind-detecting a PDCCH using multi-Rx beams (first embodiment) and (2) a method of blind-detecting a PDCCH using a single Rx beam (second embodiment) are described below.

The first embodiment, that is, the method of blind-detecting a PDCCH using multi-Rx beams, may be divided into a method 1 and a method 2 depending on whether QCL is present for the above new spatial parameter (or whether QCL is configured for the new spatial parameter).

QCL for the new spatial parameter may be simply called beam indication (for a PDCCH and/or a PDSCH).

A beam indication configuration method as a specific time instance timing unit (e.g., for each control symbol) described in the following embodiments is an example, and is not limited thereto. A beam indication configuration proposed in this specification may be provided for each separate control resource SET (CORESET) and/or through the medium of specific higher layer signaling, such as a PDCCH monitoring configuration.

In this case, the CORESET may include $N_{RB}^{CORESET}$ resource blocks in a frequency domain and $N_{symb}^{CORESET} \in \{1, 2, 3\}$ symbols in a time domain.

The $N_{RB}^{CORESET}$ and the $N_{symb}^{CORESET}$ are given by a higher-layer parameter.

That is, the following methods may be construed as being applied to a specific control symbol and/or a specific slot number in which a PDCCH is transmitted based on a beam indication configuration using specific higher layer signaling as a medium.

For example, beam indication for a CORESET #1 and beam indication for a CORESET #2 may be differently configured, and a PDCCH may be received over two (control) symbols at specific slot timing.

In this case, if a PDCCH corresponding to the CORESET #1 is received in the first control symbol and a PDCCH corresponding to the CORESET #2 is received in the second control symbol, at least one operation or method proposed in this specification may be applied based on a separate (or independent) beam indication configuration for each control symbol.

First Embodiment (Method 1)

The method 1 relates to a method of blind-detecting, by a UE, a PDCCH using multi-Rx beams if beam indication is not present (or if QCL for a new spatial parameter is not present).

An operation of a UE to blind-detect (or blind-decode) a PDCCH using multi-Rx beams may be represented as a "first operation mode" or a multi-Rx beam PDCCH blind detection mode."

In other words, the method 1 operates in a default mode when a UE does not have indication with respect to an Rx beam for PDCCH blind decoding (or blind detection).

As described in the "Tx-Rx beam association" part, a UE may select a suitable Tx-Rx beam combination through the measurement of a BRS.

In this process, the priority of a Tx-Rx beam combination may be determined based on the measurement result of a BRS.

The UE may report higher X Tx-Rx beam combinations (or corresponding Tx beam information), indicated from an NW, to the NW.

When the UE performs PDCCH blind decoding in a specific subframe set, if indication for a separate Rx beam is not present for PDCCH reception, the UE monitors or blind-decodes a PDCCH using an Rx beam corresponding to the sequence in which the Tx-Rx beam combinations (or corresponding Tx beam information) are reported for each control symbol.

In other words, the UE configures corresponding Rx beams sequentially based on the (report) priority of the Tx-Rx beam combinations, and blind-decodes a PDCCH control symbol.

That is, an operation of a UE in the default mode may mean that the UE sequentially configures corresponding Rx beams based on the report priority of Tx-Rx beam combinations and blind-detects a PDCCH for each control symbol.

(Method 2)

Next, the method 2 relates to a method of blind-detecting, by a UE, a PDCCH using multi-Rx beams if beam indication is present (or if QCL for a new spatial parameter is present).

That is, unlike in the method 1, in the method 2, an NW configures a new spatial parameter (e.g., dominant arrival angle) or QCL for the beam indication with respect to the Rx beam configuration of a UE for PDCCH decoding in a specific subframe set, and notifies the UE of the new spatial parameter or QCL. The UE blind-detects the PDCCH.

In this case, the UE may perform blind detection on the PDCCH by applying a different Rx beam through a different QCL configuration for each control symbol.

Alternatively, if the UE receives a different beams indication configuration for each CORESET through higher layer signaling, when a PDCCH corresponding to each CORESET is received for each different specific timing (e.g., for each control symbol or for each slot number), the UE may perform blind decoding (or detection) on the PDCCH by applying a different RX beam for each timing.

As described above, In relation to a different beam indication configuration for each CORESET, the concept that a different beam for each specific timing is applied to a specific signal (or a specific channel) may be identically applied to embodiments to be described later.

FIG. 8 shows an example in which QCL for a new spatial parameter has been configured for each control symbol, which is proposed in this specification.

From FIG. 8, it may be seen that 2 symbols (first and second symbols) have been allocated to a control symbol for PDCCH reception.

A UE may independently configure search spaces for different Rx beams using QCL 1 (e.g., dominant arrival angle 1) information and QCL 2 (e.g., dominant arrival angle 2) information in respective control symbols, and may perform blind decoding on a PDCCH.

The QCL 1 and the QCL 2 may be transmitted from an NW to the UE through L1 signaling or L2 signaling dynamically (subframe in which a PDCCH is monitored) in a previous X-th subframe.

Alternatively, the QCL 1 and QCL 2 may be transmitted through L3 signaling semi-statically.

In this case, the first control symbol may be defined as a control symbol for a primary PDCCH, and the second control symbol may be defined as a control symbol for a secondary PDCCH.

In this case, the primary and the secondary may mean the priority of a search space for the blind decoding of the UE.

In FIG. 8, the primary PDCCH may be decoded through the DMRS of the first symbol configured as QCL 1, and the secondary PDCCH may be decoded through the DMRS of the second symbol configured as QCL 2.

Accordingly, the UE performs independent DMRS demodulation on each search space for the decoding of each PDCCH.

For example, the primary PDCCH may be transmitted from an eNB to a corresponding UE using the best Tx beam. For corresponding Rx beam setting, QCL 1 is configured. In contrast, the secondary PDCCH is for PDCCH reception more robust than the primary PDCCH, and may be transmitted using the second best Tx beam (or multiple best Tx beams). For corresponding Rx beam setting, QCL 2 may be configured.

In other words, the Tx beam of the PDCCH may be changed based on the scheduling of the eNB. The Rx beam of the UE for the PDCCH may be configured or determined through a QCL configuration.

Furthermore, a MIMO scheme more robust than that of the primary PDCCH may be used for the secondary PDCCH.

That is, the method 2 has an advantage in that the PDCCH resource operation of an eNB may be more free compared to the method because (PDCCH) Rx beam setting is possible through QCL.

Additionally, in the method 2, a primary PDCCH may be not detected through the best Tx-Rx beam due to blockage, and only the decoding of a secondary PDCCH may be possible.

In this case, a UE may determine that the best Tx-Rx beam is not good and may override the Rx beam of a secondary PDCCH and use it as a PDSCH Rx beam.

In other words, the UE may share a DMRS for the secondary PDCCH for the use of a DMRS for PDSCH reception.

In contrast, in the method 2, if a UE has detected a primary PDCCH, it may override the Rx beam of a primary PDCCH and use it as a PDSCH Rx beam.

This means that a DMRS for the primary PDCCH may be used for a DMRS for PDSCH reception.

In the method 1 and the method 2, all configured DCI information of a corresponding UE may be received in the primary PDCCH.

If a UE receives all configured DCI information in a primary PDCCH from an eNB, the UE may omit the blind decoding of a secondary PDCCH. That is, through the process, the complexity of blind decoding by a UE for a PDCCH can be reduced.

Second Embodiment

The second embodiment relates to a method of blind-detecting, by a UE, a PDCCH using a single Rx beam if beam indication is present (or if QCL for a new spatial parameter is present).

In this case, an operation for the UE to blind-detect the PDCCH using a single Rx beam may be represented as a "second operation mode" or a "single Rx beam PDCCH blind detection mode."

A UE may perform a PDCCH reception operation by applying the same Rx beam through the same QCL configuration for each control symbol.

A UE may share DMRS demodulation information of each control symbol in order to decide the search space of each control symbol due to the same QCL configuration.

Third Embodiment

The third embodiment relates to a method of searching, by a UE, part of a PDCCH search space corresponding to an indicated (by NW) Rx beam.

With respect to an indicated Rx beam, a UE may perform PDCCH blind decoding on part of the search space through search space mapping.

In this case, the indicated Rx beam and the search space mapping may be previously configured in the corresponding UE through higher layer signaling (e.g., RRC signaling).

That is, the second embodiment is a method of decoding, by a UE, the search space of all PDCCHs. In contrast, the third embodiment is a method of decoding only the search space of part of a PDCCH search space, and can reduce a load of a UE for PDCCH decoding. As a result, power of the UE can be reduced.

The above-described new spatial parameter is described more specifically below.

The new spatial parameter may be called QCL indication or beam indication.

That is, the new spatial parameter may mean a parameter providing notification that the resource of a BRS and a PDCCH and/or PDSCH resource have been QCLed.

As described above, for the Rx beam configuration of a UE for PDCCH decoding, an NW may transmit, to the UE, information (QCL indication or new spatial parameter or beam indication) indicating that a specific BRS (e.g., a mobility RS (MRS), a synchronize signal (SS) block, a CSI-RS) and a DMRS for PDCCH demodulation have been QCLed spatially partially (e.g., a dominant arrival angle (DAA), the mean of arrival angle). The UE may decode the PDCCH in a BRS Rx beam direction based on the corresponding information.

The NW may transmit, to the UE, QCL indication (or beam indication for PDCCH reception) dynamically in a previous X-th subframe (in which the PDCCH is monitored based on corresponding QCL indication) through L1 signaling or L2 signaling or may transmit the QCL indication through L3 signaling semi-statically.

(1) If the QCL indication is transmitted through only L1 signaling (e.g., DCI), there is an advantage in that an eNB can schedule DCI dynamically, but there is a disadvantage in that the payload size of DCI greatly increases.

(2) If the QCL indication is transmitted through only L2 signaling (MAC CE), a problem in that the size of DCI payload increases can be solved, but there is a disadvantage in that latency is relatively increased compared to the L1 signaling.

(3) If the QCL indication is transmitted through only L3 signaling (RRC message), there is no restriction to the size of DCI payload, but there is a disadvantage in that there is a limit to the PDCCH scheduling of an eNB because the RRC message is transmitted in a relatively long period.

Accordingly, in order to properly take the advantages and disadvantages of the (1) to (3), an NW may combine the following three cases and hierarchically signal to a UE for QCL indication.

For example, an NW may configure N beam sets (or beam groups) for the PDCCH reception of a UE, and may notify the UE that a PDCCH Rx beam has to be configured using which beam set for each slot (or subframe) through L2 signaling or L3 signaling.

More specifically, the NW may designate the period of a slot that needs to be received for each beam set and a multiple of a slot number in such a manner that priority is assigned to N beam sets, the first beam set is configured every slot number of a multiple of 4, and the second beam set is configured every slot number of a multiple of 7.

Such a method can be naturally expanded to a specific pattern method in each beam set. If beam sets that need to be received in the same slot overlap (or are to overlap), a UE may configure a beam set based on priority or a pre-designated sequence.

Such a beam set may be beam information corresponding to a specific BRS or BRS set.

If multiple beam sets are configured in a slot in which a PDCCH is received, an eNB may dynamically indicate that a corresponding PDCCH should be received in which beam set through L1 signaling or L2 signaling with respect to a UE.

Alternatively, the eNB may indicate that a corresponding PDCCH should be received using which beam within a specific beam set configured in a specific slot with respect to the UE.

A detailed method of configuring N beam sets (or beam groups) for PDCCH reception may be described as in the following options.

(Option 1)

Option 1 is a method of configuring N beam sets (or beam groups) for PDCCH reception based on the beam report of a UE (without separate eNB signaling).

For example, if a UE reports M-beam information, an NW may map M beams to N beam sets using M-beam direction information and RSRP.

For example, beam information having the greatest RSRP may be mapped to the first beam set, and the remaining (M−1) beams may be mapped to the second beam set.

The mapping method may be performed in various ways using a method previously agreed between an eNB and a UE.

(Option 2)

Option 2 is a method of configuring, by an eNB, a beam set by indicating the activation/deactivation of N beam sets, configured through L3 signaling (RRC message), through L2 signaling (MAC-CE).

In this case, a UE does not receive a PDCCH or may receive a PDCCH through an alternate beam set by default (or according to pre-designated priority) in a slot corresponding to a deactivated beam set.

(Option 3)

An eNB may update or substitute a beam within a beam set through L2 signaling (MAC-CE) or L3 signaling (RRC message) with respect to each beam set.

For example, it is assumed that two beam sets are defined and the two beam sets are {#3, #8} and {#8, #4}.

Beam information of the first beam set may be updated with #11 or another piece of beam information may be added or the deletion of the existing beam information may be indicated through L2 signaling or L3 signaling with respect to a UE having the above beam information.

(Option 4)

An eNB may indicate a specific beam in a beam set of a corresponding slot through L1 signaling (DCI) with respect to a UE.

For example, if information on 4 beams of {#2, #4, #9, #5} is included in the first beam set, an eNB may dynamically determine a specific beam within the beam set using 2 bits.

For example, the 2 bits may be defined as "00" (first beam), "01" (second beam), "10" (third beam), and "11" (fourth beam).

If only one piece of beam information is included in the beam set of the corresponding slot, the DCI signaling of an NW may be omitted. If separate signaling is not present, a UE may receive a PDCCH in the first beam according to pre-designated priority within the beam set.

If the UE receives PDCCHs in several beam directions at the same time, an eNB may indicate the signaling in a bitmap form.

For example, if a bitmap is [1 0 0 1], this may mean that a PDCCH is received in a corresponding slot through the first Rx beam, the fourth Rx beam.

Furthermore, the L1 signaling may be transmitted in the PDCCH of an X-th (>=1) slot or subframe prior to (PDCCH reception).

Some of or all the above-described options (Option 1 to 4) may be applied at the same time, and beam indication (or QCL indication) for PDCCH reception may be configured as various combinations.

Furthermore, as described above, beam information within a beam set indicates a BRS (e.g., a mobility RS (MRS), a synchronize signal (SS) block or a CSI-RS). Beam information, such as a beam #3 or #6, is indicated for convenience of understanding, and may indicate the resource index, resource index/antenna port index or ID of each RS.

Option 1 is described more specifically.

As described above, an eNB may update or designate beam information of N beam sets (or beam pair link) for the PDCCH reception of a UE based on the beam reporting of the UE.

In this case, an NW may notify the UE of the update or modification of the beam information based on the beam reporting of the UE through separate signaling in order to confirm the update or modification.

In this case, a message for the confirmation may be transmitted to the UE through DCI or a MAC-CE.

Alternatively, the eNB may add 1 bit for the confirmation to the DCI indicating each beam set (or beam pair link), and may notify the UE of confirmation information regarding whether each beam set has been updated.

For example, there are N beam sets in each of which one piece of beam information may be allocated to each beam set, and reported beam information may be designated and updated in each beam set through M (<=N) beam reporting.

In this case, the eNB may provide notification that all the beam sets have been updated based on the M beam reporting through the DCI or MAC-CE of a corresponding confirmation message or may provide notification that a corresponding beam set is individually updated with reported beam information by adding 1 bit to DCI information for designating a specific beam set at the same time.

Accordingly, the UE that has received the confirmation message from the eNB may update PDCCH Rx beam information for each beam set based on the beam-reported beam information, and may receive a PDCCH.

The following contents are additionally described in relation to the above contents.

For beam indication for monitoring an NR-PDCCH, various signaling methods, such as DCI signaling, MAC-CE signaling, RRC signaling, specification-transparent and/or combinations of these signaling methods, may be taken into consideration.

The beam indication may have the same meaning as the above-described new spatial parameter or QCL indication.

First, in a given symbol/slot or NR-PDCCH time/frequency domain resource, some rules and/or configurations regarding a time/frequency domain pattern may be used for NR-PDCCH reception.

In order to scheduling restriction from the approach method, what control beam information for the dynamic indication of a PDCCH beam may be transmitted prior to PDCCH transmission may be taken into consideration.

If a plurality of candidate beams for NR-PDCCH reception is present, 2-level indication based on L1 signaling or L2 signaling along with an RRC configuration may be taken into consideration because DCI-only indication may not be proper due to the restriction of a DCI payload size.

For example, the NR-PDCCH time/frequency/space region monitoring resource of each beam pair link (BPL) may be configured by RRC, and an accurate PDCCH beam may be indicated by dynamic signaling, such as a MAC-CE or DCI signaling.

Furthermore, this may be dynamically indicated only when a BPL is changed.

In this case, beam information of each BPL may be implicitly updated based on beam reporting information.

That is, a beam direction related to N BPLs may be mapped as N-beam reporting information in a given rule, such as an RSRP/CQI-base sequence.

In this case, an NW (or an eNB) may transmit, to a UE, a confirmation regarding that a reported beam is applied to each BPL.

Dynamic beam indication for an NR-PDCCH is taken into consideration, and dynamic signaling indicates one or more of the following information.

Selection of a beam within a set for each BPL

BPL switching

Beam change confirmation of each BPL for a reported beam

Table 6 is an example of the third embodiment, and is a table showing a method of differently configuring a beam in which blind decoding is performed for each DCI format.

TABLE 6

|       | Rx beam #1 | Rx beam #2 | Rx beam #3 |
|-------|------------|------------|------------|
| DCI 0 | ○          | ○          | ○          |
| DCI 1 | ○          | ○          | X          |
| DCI 2 | ○          | X          | X          |
| DCI 3 | ○          | X          | X          |

A UE may be configured with a total of N Rx beams (Tx-Rx beam pair, Tx-Rx associated beam) as PDCCH Rx beams.

Table 6 shows an example when N=3, assuming that four DCI formats are configured as 0-3.

As in Table 6, a DCI format in which blind decoding is performed may be differently configured for each Rx beam (Tx-Rx beam pair, Tx-Rx associated beam) in which a PDCCH is received.

For example, a PDCCH may be chiefly received in the Rx beam #1, and a PDCCH may be received in the Rx beam #2 and the Rx beam #3 in a longer period than the Rx beam #1 for the robustness of a UE.

In this case, the PDCCH decoding load of the UE for can be reduced by decoding only the PDCCH of a given part through the Rx beam #2 and the Rx beam #3.

An eNB may previously configure a DCI format for each Rx beam through higher layer signaling.

Furthermore, the third embodiment may be identically applied to an uplink physical uplink control channel (PUCCH).

For example, an UCI format may be differently configured for each Tx beam (or beam pair link, Tx-Rx associated beam) of a UE that transmits a PUCCH.

Fourth Embodiment

The fourth embodiment relates to a method of allocating a time gap to a multi-symbol PDCCH by taking beam switching latency into consideration and reporting the capability of a UE for the allocation, if the UE receives a multi-symbol PDCCH through a different Rx beam (Tx-Rx associated beam) within one slot (or subframe).

FIG. 9 is a diagram showing an example in which a time gap has been allocated within a multi-symbol PDCCH, which is proposed in this specification.

As shown in FIG. 9a, a UE may receive a PDCCH through a different Rx beam (or Tx-Rx associated beam, beam pair).

In this case, although a different Rx beam corresponds to a different panel or changed within one panel, beam switching may be difficult within the cyclic prefix (CP) of an OFDM symbol due to the latency of hardware depending on a UE.

Accordingly, in such a situation, there may be a problem when a corresponding UE receives a multi-symbol PDCCH within one slot (or subframe) through a different Rx beam.

In order to solve this problem, an eNB previously requests capability information for the beam switching latency of a corresponding UE from the corresponding UE through a higher layer message (or signaling).

Alternatively, the capability information for the beam switching latency may be previously transmitted from the UE to the eNB through an RRC message.

In this case, in the case of a UE whose beam switching latency is a given threshold or more, an eNB may allocate a time gap between PDCCH symbols so that the corresponding UE receives a PDCCH through a different Rx beam, as in FIG. 9b.

The time gap may be one piece of OFDM symbol duration or may be time duration previously designated by taking beam switching latency into consideration.

In the case of a UE that receives a PDCCH through a different Rx beam, an eNB may transmit information on a time gap for the corresponding UE through L1 signaling or L2 signaling dynamically or through L3 signaling semi-statically.

The fourth embodiment may be identically applied to an UL PUCCH.

For example, if a multi-symbol PUCCH is transmitted through a different Tx beam (or beam pair link, Tx-Rx associated beam), a time gap may be defined between PUCCH symbols by taking into consideration the beam switching latency of a UE (or eNB), and a PUCCH may be transmitted.

The contents related to the fourth embodiment are additionally described as follows.

NR-PDCCH transmission supports robustness for beam pair link blocking.

A UE may be configured to monitor NR-PDCCHs on an M-beam pair link at the same time.

M≥1. a maximum value of M may depend on at least a UE capability.

(The UE may select at least one beam among the M-beam pair link for NR-PDCCH reception.)

A UE may be configured to monitor an NR-PDCCH on a different beam pair link(s) in different NR-PDCCH OFDM symbols.

(an NR-PDCCH on one beam pair link is monitored in a shorter duty cycle that that of another beam pair link(s)).

A parameter related to UE Rx beam setting for monitoring an NR-PDCCH on a plurality of beam pair links may be configured by higher layer signaling or a MAC CE or is taken into consideration in the search space design.

The start position of downlink data in a slot may be indicated explicitly and dynamically with respect to a UE.

This may be signaled by a UE-specific DCI and/or a "group-common PDCCH."

For the reception of a unicast DL data channel, the indication of a spatial QCL assumption between a DL RS antenna port and the DMRS antenna port of a DL data channel is supported: information indicating an RS antenna port is indicated through a DCI (downlink grants).

This information indicates the RS antenna port QCLed with the DMRS antenna port.

The information may explicitly indicate an RS port or a resource ID or may be implicitly obtained.

For example, the information (or QCL indication) or indication may be applied to only a scheduled PDSCH or may be applied up to only the following indication.

A candidate signaling method of beam indication for an NR-PDCCH (i.e., a configuration method of monitoring an NR-PDCCH) may be MAC CE signaling, RRC signaling, DCI signaling, specification transparent and/or implicit method or combinations of them.

Fifth Embodiment

In another embodiment, a method of indicating a PDSCH beam using DCI, which is proposed in this specification, is described.

That is, the first embodiment relates to a beam relation between a control channel and a data channel.

First, what a Tx/Rx beam for a DL data channel is the same as a Tx/Rx beam for a DL control channel may be taken into consideration.

If the same beam is used for control channel and corresponding data channel transmission, a DMRS may be shared for control channel and data channel demodulation in order to reduce DMRS overhead. Additional beam information for an NR-PDSCH capable of reducing signaling overhead does not need to be indicated.

FIG. 10 shows an example of a control channel and in which different beams are used for corresponding data channel transmission to which a method proposed in this specification may be applied.

In contrast, if a decoupling beam is permitted for a control channel and a data channel, more freedom may be provide to optimize a data beam. For example, a serving Tx beam for an NR-PDSCH may be sharper than a serving Tx beam for an NR-PDCCH in order to improve a data throughput.

Furthermore, as shown in FIG. 10, the transmission of NR-PDSCHs from a plurality of TRPs may be permitted.

For flexible DL data transmission, NR-PDSCH beam information may be dynamically signaled through a corresponding NR-PDCCH.

In this case, a time gap may be necessary between the control channel and the data channel due to beam switching latency. Likewise, the time gap may be necessary even in FIG. 9.

Such a characteristic may depend on a UE capability regarding beam switching latency.

That is, to define a time gap between a primary PDCCH and a second PDCCH and between a PDCCH and a PDSCH depending on the capability of a UE may be taken into consideration.

As described above, in NR, the Rx beams (or Tx-Rx beam association, beam pair link (BPL)) of a control channel and a data channel may be differently configured for dynamic point selection and flexible data transmission.

To this end, NR-PDSCH beam indication may be dynamically configured through DCI.

The NR-PDSCH beam indication may indicate information indicating an RS port spatially QCLed with a DMRS port for PDSCH demodulation, for Rx beam setting.

If DCI decoding latency of an indicated beam is different from that of a PDCCH Rx beam with respect to DCI signaling for the PDSCH Rx beam setting, a consideration for the Rx beam switching latency of a UE is necessary for PDSCH reception.

It may assume that a corresponding eNB is aware of the decoding capability of the UE and UE capability information regarding the beam switching latency by previously forwarding them through a higher layer signal (RRC message, MAC-CE, etc.).

Hereinafter, a detailed method of DCI signaling for PDSCH Rx beam setting and a corresponding operation of a UE are described below.

The number of bits of DCI signaling of for a PDSCH Rx beam configuration may be different depending on the number of pre-configured PDSCH Rx beams (or BPLs).

The DCI signaling may indicate a specific Rx beam within a PDSCH Rx beam (or BPL) pre-configured through RRC or a MAC-CE or may indicate that the specific Rx beam is received as a characteristic beam pair within a beam pair group configured as the Rx beam of a PDCCH.

For example, if PDSCH beam indication is defined as DCI of 2 bits, a "00" value may indicate that a PDSCH is received through a pre-designated default Rx beam or a PDSCH is received through the same beam as a PDCCH Rx beam.

A "01" value may indicate that a PDSCH is received through a pre-configured secondary Rx (or secondary BPL).

"10" and "11" values may indicate that a PDSCH is received through a pre-configured $3^{rd}$ Rx beam, 4th Rx beam.

A UE operation according to such a PDSCH beam indication may be as follows.

(1) If the PDSCH beam indication is "00" and indicates that a PDSCH is received through the same Rx beam as a PDCCH Rx beam In this case, a UE may receive DL data (or PDSCH) without taking into consideration beam switching latency because it does not require the switching of an Rx beam.

For example, if an OFDM symbol offset necessary between a DL grant and a corresponding PDSCH is "x" by taking into consideration DCI decoding latency, when a UE receives the DL grant in an n-th OFDM symbol from an eNB, the UE may expect that the corresponding PDSCH is started or received after an (n+x)-th OFDM symbol.

Furthermore, an eNB may dynamically indicate the reception position (or timing) of DL data through DCI. The DCI may indicate and indicate that the reception of the DL data is after at least the (n+x)-th OFDM symbol.

(2) If the beam indication is set as "00" and indicates that a PDSCH is received through a default Rx beam or is set as "01", "10" or "11" and indicates that a PDSCH is received through an Rx beam different from a PDCCH Rx beam An eNB previously configures the default PDSCH Rx beam through RRC or a MAC-CE, and a corresponding default PDSCH Rx beam may be different from a PDCCH Rx beam.

In response thereto, a corresponding UE receives DL data from the eNB by additionally taking into consideration Rx beam switching latency.

For example, when an OFDM symbol offset necessary between a DL grant and corresponding PDSCH reception is "y (y may be greater than or equal to x)" by taking into consideration DCI decoding latency and beam switching latency at the same time, if a UE has received the DL grant in an n-th OFDM symbol from an eNB, the UE may expect that a corresponding PDSCH starts (or is received) after an (n+y)-th OFDM symbol.

If the OFDM symbol position (or timing) of a data reception signal in DCI is "n+r" smaller than "n+y", the UE may neglect it and receive the PDSCH from the eNB after "n+x."

Alternatively, the eNB may dynamically indicate the reception position of the DL data through DCI. The DCI may indicate that the reception position of the DL data is limited after at least n+y.

As another method, the PDSCH beam indication may include the Rx beam indication of a subsequent slot, not a corresponding slot, by taking the beam switching latency into consideration. For example, beam indication for the PDSCH reception of an (n+x)-th slot through DCI may be possible in an n-th slot.

In this case, the "x" value is previously set through higher layer signaling. If the "X" value has been set as "0", it may operate as the first embodiment.

In order to perform (or operate) flexible DL data transmission, NR-PDSCH beam information may be dynamically signaled through an NR-PDCCH.

Furthermore, in order to support UE-side beamforming/reception, an NR needs to aim at low overhead indication for a spatial QCL assumption.

According to an NR-PDSCH beam, it is necessary to indicate PDSCH RE mapping information that may include a PDSCH start symbol. That is, in some cases, it is necessary to provide a ZP CSI-RS resource ID, a beam switching time gap and a DCI decoding time for protecting the CSI-RS of a neighbor beam.

Accordingly, as in the LTE spec. including a PQI field, in order to reduce a DCI payload size, joint encoding between at least two needs to be taken into consideration.

In other words, to support the dynamic switching of an NR-PDSCH beam may be similar to a coordinated multiple point (CoMP) DPS in the spec. influence viewpoint.

Accordingly, there is proposed to support an NR-PQI in an NR-PDCCH. Each NR-PQI state indicates a CSI-RS resource ID QCLed with PDSCH RE mapping for the PDSCH beam indication in addition to CoMP.

That is, a UE may be assumed to have a spatial QCL assumption from CRI indication in each NR-PQI state which may be updated by MAC control element (CE) signaling.

If one of NR-PQI states indicates a default mode not having CRI indication, it is assumed that a UE has the same spatial QCL assumption between the DMRS of a PDCCH and the DMRS of a PDSCH.

An NR-PQI included in DCI may be used as follows with respect to NR-PDSCH beam indication.

In each NR-PQI state, a spatial QCL link for a CRI is provided for NR-PDSCH Rx beam indication.

One of the NR-PQI states is used for a default mode assumed to have the same spatial QCL assumption between the DMRS of a PDCCH and the DMRS of a PDSCH.

Each NR-PQI state may be updated by MAC-CE signaling.

That is, as described above, NR PDSCH beam indication newly defines an NR-PQI, and each NR-PQI state may be indicated/configured through the NR-PQI.

If a default mode (i.e., if the same beam is applied to a PDCCH and a PDSCH) is indicated in the NR-PQI states, a UE assumes the DMRS of a PDSCH and the DMRS of a PDCCH to be the same spatial QCL assumption. An eNB previously indicated/configure it.

The bit side of the PQI field may be increased by an eNB indication/configuration (e.g., RRC signaling) by taking into consideration a CoMP operation.

Furthermore, one part, such as the PDSCH RE mapping, QCL configuration of the PQI state description may be omitted or updated through MAC-CE signaling.

FIG. 11 is a flowchart showing an example of a method of transmitting and receiving a plurality of signals using different Rx beams, which is proposed in this specification.

First, a UE receives a beam reference signal used for beam management from an eNB through a first Rx beam (S1110).

Thereafter, when beam reporting is triggered, the UE reports, to the eNB, a measurement result according to the beam reference signal (S1120).

Thereafter, the UE receives, from the eNB, control information related to the determination of a second Rx beam for receiving a specific signal (S1130).

For example, the specific signal may be a physical downlink control channel (PDCCH). Hereinafter, a PDCCH is described as an example.

Specifically, the control information may indicate a resource quasi co-located (QCL) with the resource of a demodulation reference signal (DMRS) for the PDCCH reception, as described above.

Furthermore, the resource quasi co-located (QCL) with the resource of the demodulation reference signal (DMRS) for the PDCCH reception may be a resource of the beam reference signal.

The above-described resource may be an antenna port, a beam direction, an arrival angle, etc. as described above.

Furthermore, the control information may be represented as a bitmap.

Furthermore, step S1120 may include the following procedure.

That is, the UE may receive the control information through 2-step signaling.

First, the UE may receive, from the eNB, information on a given number of beam sets for receiving the PDCCH through first signaling.

Priority may be configured with respect to each of the given number of beam sets.

Furthermore, the UE may receive, from the eNB, information indicating a specific beam set configured for each specific time unit through second signaling.

In a detailed procedure of step S1120, the first signaling, the second signaling may be layer 1 signaling (L1 signaling), L2 signaling or L3 signaling.

Thereafter, the UE receives the specific signal through the second Rx beam based on the received control information (S1140).

In this case, if the UE receives, from the eNB, a plurality of specific signals through different symbols included in a specific time domain, the control information may be configured for each specific resource and received from the eNB.

In this case, the specific resource may mean a PDCCH or a CORESET.

The specific time domain may include at least one time gap determined by taking into consideration at least one of the decoding time of the control information or beam switching latency between Rx beams for the reception of a plurality of PDCCHs.

Additionally, the UE may transmit, to the eNB, UE capability information indicating the capability of the UE related to the beam switching latency. A corresponding step may be performed prior to step S1110.

Furthermore, if the at least one time gap is included in the specific time domain, the UE may receive, from the eNB, information related to the at least one time gap.

In this case, the information related to the at least one time gap may include at least one of the number of time gaps included in the specific time domain or duration of the time gap.

Furthermore, if the eNB has updated information related to a beam based on the beam reporting of the UE, the eNB may transmit, to the UE, a confirm message for providing notification of the updated information related to the beam.

Additionally, the UE may receive, from the eNB, information on an Rx beam related to the PDSCH reception, which will be described in FIG. 12 later. In this case, contents described in FIG. 12 may be applied to FIG. 11.

FIG. 12 is a flowchart showing an example of a method of indicating a PDSCH Rx beam using a physical control channel, which is proposed in this specification.

The above-described contents of FIG. 11 may also be applied to FIG. 12.

That is, the following contents may be performed after the contents of FIG. 11 or the following contents may be separately performed.

A UE may receive, from the eNB, indication information indicating a third Rx beam for receiving the PDSCH (S1210).

Thereafter, the UE receives a physical downlink shared channel (PDSCH) from the eNB based on the indication information (S1220).

Step S1220 may be performed prior to step S1210.

The indication information may indicate a pre-configured Rx beam or may indicate the same Rx beam as the second Rx beam.

The pre-configured Rx beam may be represented as a default Rx beam. The second Rx beam may indicate an Rx beam for receiving a PDCCH.

The UE may receive, from the eNB, the PDSCH after a specific offset from timing in which the indication information was received. The specific offset may be determined by taking into consideration at least one of a decoding time for the indication information or beam switching latency.

General Apparatus to which the Present Invention May be Applied

FIG. 13 illustrates a block diagram of a wireless communication device according to an embodiment of the present invention.

Referring to FIG. 13, a wireless communication system includes an eNB (or network) 1310 and a UE 1320.

The eNB 1310 includes a processor 1311, a memory 1312, and a communication module 1313.

The processor 1311 implements the functions, processes and/or methods proposed in FIGS. 1 to 12. The layers of a wired/wireless interface protocol may be implemented by the processor 1311. The memory 1312 is connected to the processor 1311 and stores various types of information for driving the processor 1311. The communication module 1313 is connected to the processor 1311 and transmits and/or receives wired/wireless signals.

The communication module 1313 may include a radio frequency (RF) unit for transmitting/receiving a radio signal.

The UE 1320 includes a processor 1321, a memory 1322, and a communication module (or the RF unit) 1323. The processor 1321 implements the functions, processes and/or methods proposed in FIGS. 1 to 12. The layers of a radio interface protocol may be implemented by the processor 1321. The memory 1322 is connected to the processor 1321 and stores various types information for driving the processor 1321. The communication module 1323 is connected to the processor 1321 and transmits and/or receives a radio signal.

The memory 1312, 1322 may be positioned inside or outside the processor 1311, 1321 and may be connected to the processor 1311, 1321 by various well-known means.

Furthermore, the eNB 1310 and/or the UE 1320 may have a single antenna or multiple antennas.

FIG. 14 illustrates a block diagram of a communication device according to an embodiment of the present invention.

Particularly, FIG. 14 is a diagram illustrating the UE of FIG. 13 more specifically.

Referring to FIG. 14, the UE may include a processor (or digital signal processor (DSP)) 1410, an RF module (or RF unit) 1435, a power management module 1405, an antenna 1440, a battery 1455, a display 1415, a keypad 1420, a memory 1430, a subscriber identification module (SIM) card 1425 (this element is optional), a speaker 1445, and a microphone 1450. The UE may further include a single antenna or multiple antennas.

The processor 1410 implements the function, process and/or method proposed in FIGS. 1 to 12. The layers of a radio interface protocol may be implemented by the processor 1410.

The memory 1430 is connected to the processor 1410, and stores information related to the operation of the processor 1410. The memory 1430 may be positioned inside or outside the processor 1410 and may be connected to the processor 1410 by various well-known means.

A user inputs command information, such as a telephone number, by pressing (or touching) a button of the keypad 1420 or through voice activation using the microphone 1450, for example. The processor 1410 receives such command information and performs processing so that a proper function, such as making a phone call to the telephone number, is performed. Operational data may be extracted from the SIM card 1425 or the memory 1430. Furthermore, the processor 1410 may recognize and display command information or driving information on the display 1415, for convenience sake.

The RF module 1435 is connected to the processor 1410 and transmits and/or receives RF signals. The processor 1410 delivers command information to the RF module 1435 so that the RF module 1435 transmits a radio signal that forms voice communication data, for example, in order to initiate communication. The RF module 1435 includes a receiver and a transmitter in order to receive and transmit radio signals. The antenna 1440 functions to transmit and receive radio signals. When a radio signal is received, the RF module 1435 delivers the radio signal so that it is processed by the processor 1410, and may convert the signal into a baseband. The processed signal may be converted into audible or readable information output through the speaker 1445.

The aforementioned embodiments have been achieved by combining the elements and characteristics of the present invention in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. Order of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative, but should be construed as being illustrative from all aspects. The scope of the present invention should be determined by reasonable analysis of the attached claims, and all changes within the equivalent range of the present invention are included in the scope of the present invention.

INDUSTRIAL APPLICABILITY

The signal transmission and reception methods using a beam in a wireless communication system of the present invention have been illustrated based on an example in which it is applied to the 3GPP LTE/LTE-A system and 5G, but may be applied to various wireless communication systems in addition to the 3GPP LTE/LTE-A system and 5G.

The invention claimed is:

1. A user equipment (UE) operating in a wireless communication system, the UE comprising:
    a transceiver for transmitting and receiving radio signals; and
    a processor operatively coupled to and controlling the transceiver,
    wherein the processor is configured to:
        receive, from a base station, configuration information related to a control resource to monitor a physical downlink control channel (PDCCH),
        wherein the configuration information includes N (N being a natural number) quasi co-location (QCL) information for providing a QCL relationship between (i) a downlink (DL) reference signal (RS) and (ii) a demodulation reference signal (DM-RS) antenna port for the PDCCH;
        receive, from the base station, a medium access control (MAC) control element (CE) for indicating QCL information to be applied for the control resource among the N QCL information; and
        receive, from the base station, the PDCCH on the control resource based on the QCL information indicated by the MAC CE,
        wherein the QCL information includes a spatial reception parameter, and
        wherein considering a time offset between reception of downlink control information (DCI) in the PDCCH and reception of a physical downlink shared channel (PDSCH) scheduled by the DCI, QCL information for the PDSCH is determined to be identical to the QCL information applied for the control resource.

2. The UE of claim 1, wherein the QCL information includes information of a QCL type including at least one of a Doppler shift, a Doppler spread, an average delay, a delay spread, and/or an average gain.

3. The UE of claim 1, wherein the DL RS includes a channel state information reference signal (CSI-RS) or a synchronization signal block (SSB).

4. A method performed by a user equipment (UE) in a wireless communication system, the method comprising:
    receiving, from a base station, configuration information related to a control resource to monitor a physical downlink control channel (PDCCH),
    wherein the configuration information includes N (N being a natural number) quasi co-location (QCL) information for providing a QCL relationship between (i) a downlink (DL) reference signal (RS) and (ii) a demodulation reference signal (DM-RS) antenna port for the PDCCH;
    receiving, from the base station, a medium access control (MAC) control element (CE) for indicating QCL information to be applied for the control resource among the N QCL information; and
    receiving, from the base station, the PDCCH on the control resource based on the QCL information indicated by the MAC CE,
    wherein the QCL information includes a spatial reception parameter, and
    wherein considering a time offset between reception of downlink control information (DCI) in the PDCCH and reception of a physical downlink shared channel (PDSCH) scheduled by the DCI, QCL information for the PDSCH is determined to be identical to the QCL information applied for the control resource.

5. The method of claim 4, wherein the QCL information includes information of a QCL type including at least one of a Doppler shift, a Doppler spread, an average delay, a delay spread, and/or an average gain.

6. The method of claim 4, wherein the DL RS includes a channel state information reference signal (CSI-RS) or a synchronization signal block (SSB).

* * * * *